US010422896B1

(12) United States Patent
Ianakiev et al.

(10) Patent No.: US 10,422,896 B1
(45) Date of Patent: Sep. 24, 2019

(54) HIGH COUNT RATE THERMAL NEUTRON DETECTORS AND ELECTRONICS

(71) Applicant: Triad National Security, LLC, Los Alamos, NM (US)

(72) Inventors: Kiril Ianakiev, Los Alamos, NM (US); Metodi Iliev, Los Alamos, NM (US); Martyn Swinhoe, Los Alamos, NM (US); Michael Browne, Los Alamos, NM (US); Adrienne LaFleur, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/791,297

(22) Filed: Oct. 23, 2017

Related U.S. Application Data

(60) Provisional application No. 62/411,898, filed on Oct. 24, 2016.

(51) Int. Cl.
*G01T 1/17* (2006.01)
*G01T 3/00* (2006.01)

(52) U.S. Cl.
CPC .................. *G01T 3/008* (2013.01)

(58) Field of Classification Search
CPC ......... G01T 3/008; G01T 1/17; G01T 1/2018; G01T 1/2042; G01T 3/085
See application file for complete search history.

(56) References Cited

U.S. PATENT DOCUMENTS

2008/0001083 A1* 1/2008 Schaefer ............ H01J 49/0031
250/290

OTHER PUBLICATIONS

A. Favalli et al., "Design and Characterisation of a Pulsed Neutron Interrogation Facility", Radiation Protection Dosimetry (2007), vol. 126, No. 1-4, pp. 74-77.
A. Favalli et al., "Pulsed Neutron Facility for Research in Illicit Trafficking and Nuclear Safeguards", IEEE Transactions on Nuclear Science, vol. 56, No. 3, Jun. 2009.
(Continued)

Primary Examiner — David P Porta
(74) Attorney, Agent, or Firm — LeonardPatel PC; Michael Aristo Leonard, II; Sheetal Suresh Patel

(57) ABSTRACT

Improved, high count rate thermal neutron counters and electronics enabling new, higher measurement capabilities are disclosed. Next generation $^3$He and $^{10}$B tubes may include an electronics package capable of operating at higher count rates and in higher gamma fields and providing more efficient use of $^3$He gas. Conventional detector systems may also be upgraded, providing a possible solution to measure spent nuclear fuel with high neutron efficiency previously not possible in $^{235}$U fission counter systems. Switching the number of tubes per amplifier allows use of the measured nuclear material for a calibration standard for dead time correction, increasing accuracy of neutron measurements systems. An optimized detector geometry and advanced electronics with double pulse filtering and a dual channel readout may be provided. A bipolar shaper may improve dead time, provide efficient detector use, reduce double pulsing, facilitate high count rate measurements, and allow remote threshold setting.

20 Claims, 31 Drawing Sheets

(56) References Cited

OTHER PUBLICATIONS

A. Ravazzani et al., "Characterisation of 3He Proportional Counters", Radiation Measurements, vol. 41, 2006, pp. 582-593.

Adrienne M. Lafleur, "Characterization and Performance Evaluation of a New Passive Neutron Albedo Reactivity Counter for Safeguards Measurements", Radiation Measurements, vol. 61, 2014, pp. 83-93.

D. Henzlova et al., "Quench Gas and Shaper/Discriminator Selection Influence on 3He Tube Performance for Spent Fuel Applications", 33rd ESARDA Annual Meeting, May 16-20, 2011, Budapest, Hungary.

D.H. Beddingfield et al., "He Neutron Proportional Counter Performance in High Gamma-Ray Dose Environments", Nuclear Instruments & Methods in Physics Research, A 455 (2000, 670-682.

G. Knoll, "Radiation Detection and Instrumentation"—3rd ed., Wiley & Sons, 2010, pp. 118-123, New York, NY.

G. Knoll, "Radiation Measurement", 3rd ed., pp. 178-183, Wiley & Sons, 2010, New York, NY.

H.O. Menlove et al., "Mini-Epithermal Neutron Multiplicity Counter (miniENMC) Manual", Los Alamos National Laboratory Report, (2007), LA-14350-M.

Hee Seo, et al., "Development of Prototype Induced-Fission-Based Pu Accountancy Instrument for Safeguards Applications", Applied Radiation and Isotopes, vol. 115, 2016, pp. 67-73.

IAEA Department of Safeguards Long-Term R&D Plan, Jan. 2013, 2012-2023, Vienna.

K.D. Ianakiev et al., "Front-End Electronics for Thermal Neutron Detectors", Los Alamos National Laboratory, Los Alamos, NM.

K.D. Ianakiev et al., "High Count Rate Thermal Neutron Detectors and Electronics", IAEA-CN-220-205.

K.D. Ianakiev, "Self-Calibration Method for Dead Time Losses in Neutron Counting Systems", ESARDA Symposium, 2017, Dusseldorf, Germany.

L. Eric Smith et al., "Front-End Electronics for Verification Measurements: Performance Evaluation and Viability of Advanced Tamper Indicating Measures", IAEA Safeguards Symposium, 2014.

Ludwig Holzleitner et al., "Dead-Time Correction for Any Multiplicity Using List Mode Neutron Multiplicity Counters: A New Approach—Low and Medium Count-Rates", Radiation Measurements, vol. 46 (2011), pp. 340-356.

Metodi Iliev et al., "KM200 Front-End Electronics for Thermal Neutron Detectors", INMM 57th Annual Meeting, Jul. 24-28, 2016, Atlanta, Georgia, United States.

N. Ensslin et al., "Application Guide to Neutron Multiplicity Counting", LANL, Los Alamos, NM, LA-13422-M, Nov. 1998.

R.W. Jenkins et al., "Quantitative X-rays Spectroscopy", New York, NY, 1995, pp. 172-177, Marcel Dekker, Inc.

S.J. Tobin et al., "Experimental and Analytical Plans for the Non-destructive Assay System of the Swedish Encapsulation and Repository Facilities", IAEA CN-238, Symposium, 2014.

\* cited by examiner

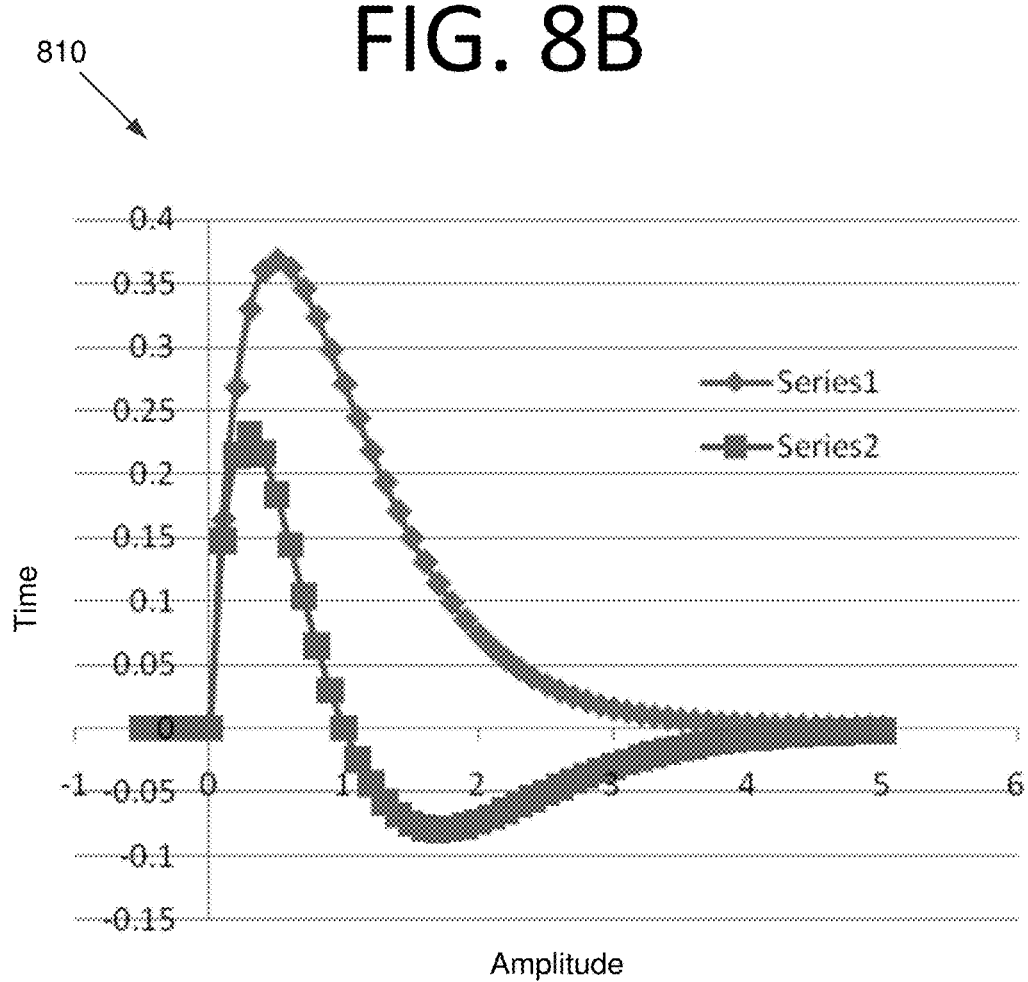

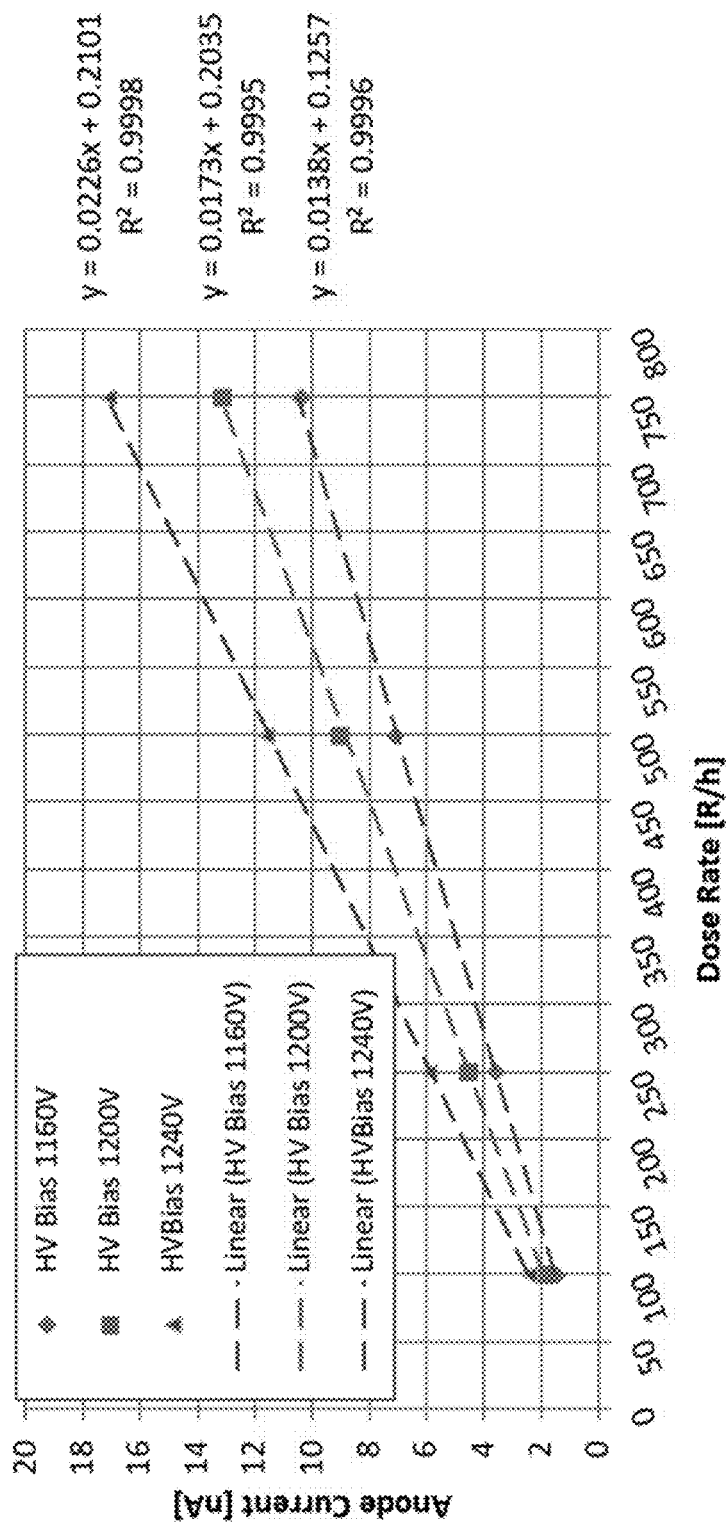

HIGH COUNT RATE THERMAL NEUTRON DETECTORS AND ELECTRONICS

CROSS-REFERENCE TO RELATED APPLICATION

This application claims the benefit of U.S. Provisional Patent Application No. 62/411,898 filed Oct. 24, 2016. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to neutron detectors, and more particularly, to high count rate thermal neutron detectors and electronics.

BACKGROUND $^3$He thermal neutron detectors and electronics are the backbone of safeguards neutron measurements and have performed relatively well in the past three decades without significant development because conventional $^3$He detectors have important beneficial properties, such as a very high cross-section for thermal neutrons and a plateau of the counting characteristics due to separated neutron and gamma distributions. The plateau mitigates the tube and electronics gain instability, and thus enables high precision measurements with relatively simple readout electronics. Conventional $^3$He counters have a gas pressure between 4 and 10 atmospheres (atm), a tube diameter of one inch, and an anode wire of 0.002 inches. The most common electronics sets consist of bipolar shapers with short time constants followed by a discrimination and logic pulse driver. Three types of electronics packages produced by PDT™ (as a standalone device), Bot Engineering™, and Canberra™ (JAB-01 boards based on the Amptek™ A-111 hybrid chip) are the preferred choice for conventional safeguards measurements.

The main limitations of $^3$He technology using standard electronics are dead time and gamma sensitivity for more demanding applications, such as multiplicity counting and spent fuel measurements. While both dead time and gamma pile-up would benefit from shorter shaping time, when the shaping time constant becomes too short, multiple triggering (i.e., so called double pulsing) occurs due to variations in the rise time of detector current pulses.

Some applications call for the use of tubes with high pressure and slow gas admixture, which makes the detector pulse slower. In this case, low dead time electronics with short shaping time will not be able to collect sufficient charge, resulting in low sensitivity. One approach that was tried was to use thinner anode wire that provided higher detector gain. However, this slowed down the detector pulse even more, and made the detector vulnerable to space charge effects. This approach would not be suitable for new safeguards challenges, such as direct measurement of plutonium (Pu) in spent fuel for the Next Generation Safeguards Initiative (NGSI), which requires the detectors to be placed in close proximity to a spent fuel assembly. Subjecting the detectors to high gamma and neutron fluxes can lead to space charge effects, requiring the use of slow but radiation tolerant gas admixes, and yielding neutron count rates many times higher than the counting capabilities of conventional detectors and electronics.

Conventional approaches to mitigate these high rate effects include tweaking the time constants of the electronics and experimental ad hoc gas mixtures and pressure that speed up the detector response. Unfortunately, these approaches have a limited effect because, while the detector dead time at a given pressure and tube geometry is reduced with increased admix concentration, the gamma sensitivity is increased since more energy can be deposited in the gas (e.g., fast proportional gas mixtures, such as $Ar+CH_4$, $Ar+CO_2$, or modern $CF_4$). The operation in high gamma fields is additionally aggravated due to the limiting situation of self-shielding effects around the anode (i.e., space charge) causing a gain shift, and thus a change of detection efficiency.

The gamma radiation also deposits energy in the thermal neutron detectors. While the gamma response of neutron detector is considered to be unwanted and parasitic, the simultaneous readout of gamma and neutron signals from same detector is a desirable feature that can save cost, space, and measurement time.

The currently used Direct Current (DC) mode gamma ionization chambers have a nonlinear response to the measured gross gamma radiation. The currently used front end electronics converting the ionization chamber DC current into easy to transmit count logic pulses with a frequency proportional to the detector current have limited dynamic range and accuracy. The recent trend for higher accuracy and extended dynamic range of these measurements requires improved gross gamma readout for these detectors.

Additionally, increasing the $^3$He gas pressure does not produce a commensurate increase in detection efficiency due to the self-shielding effects for thermal neutrons. The net result is an increased detector cost-to-efficiency ratio and gamma sensitivity as there is no self-shielding for gammas. For systems requiring a large amount of (currently very expensive) $^3$He, the diminishing efficiency return is important.

In the light of the massive research and development (R&D) effort motivated by the $^3$He gas shortage, the improvement in $^3$He detectors themselves for safeguards was neglected. Most of these mitigation approaches have successfully addressed specific problems and applications for moderate count rates. However, many interesting applications involve significant count rate increases and require a comprehensive detector and electronics redesign approach.

Thus, a technology gap exists between standard $^3$He detectors or alternatives and what is required to provide high count rate detectors. Accordingly, improved thermal neutron counters and electronics may be beneficial.

SUMMARY

Certain embodiments of the present invention may provide solutions to the problems and needs in the art that have not yet been fully identified, appreciated, or solved by conventional neutron detectors. For example, some embodiments of the present invention pertain to improved, high count rate thermal neutron counters and electronics. In some embodiments, a high count rate bipolar shaper/discriminator for thermal neutron detectors enables use of short shaping time and reduction of Dead Time (DT) losses without compromising the quality of neutron counting information by effectively filtering and suppressing the parasitic double pulsing events. In certain embodiments, a zero DT neutron counting method and electronics reduce the DT using a pulse integration technique that uses the pulse height distribution spectrum to recover the neutron pile-up pulses and include them in the analysis data stream.

In some embodiments, a self-calibration method for DT losses in neutron counting systems uses the measured count rate from the sample under test for precise correction of counting losses without relying on extrapolation of counting losses from non-representative calibration sources. In certain embodiments, neutron and gamma signals are simultaneously read out from the same detector. The existing, but in many cases, unwanted, gamma sensitivity may be used for simultaneous neutron and gamma measurements from one detector. In some embodiments, various techniques for improvements in measurement capabilities for gross neutron measurements improve gross gamma and neutron measurements as adaptive sensitivity of a $^{10}$B-lined proportional counter. In certain embodiments, the dynamic range and accuracy for gross gamma DC measurements is expanded. Nonlinearity of existing current mode gamma ionization chambers and electronics is corrected to provide an expanded measurement range with DC gamma ionization chambers.

In an embodiment, a system of high count rate thermal neutron detector electronics includes at least one neutron detector and a HV bias. The system also includes detector connection and bias circuitry operably connected to the at least one neutron detector and the HV bias. The system further includes at least one neutron counting channel and at least one total current channel operably connected to the detector connection and bias circuitry. When the system is configured to measure gammas along with neutrons rather than neutrons only, the system additionally includes at least one neutron signal subtraction module operably connected to the at least one neutron counting channel and the at least one total current channel, where the at least one neutron counting channel and the at least one signal subtraction channel each output logic pulses at average rates proportional to the at least one neutron detector.

In another embodiment, a current measurement module includes a trans-conductance amplifier (TCA) configured to produce an output voltage. The current measurement module also includes an analog-to-digital converter (ADC) operably connected to the output voltage from the TCA. The ADC is configured to convert the output voltage from the TCA to a digital value and provide the digital value as its output. Alternatively (i.e., in lieu of the ADC), the current measurement module may include voltage-to-frequency converter (VFC) operably connected to the output from the TCA. The VFC is configured to convert the output from the TCA into a pulse stream as its output.

In yet another embodiment, a neutron counting channel is configured to implement pulse width inspection for double pulsing rejection. The neutron counting channel includes a first inverter that receives a discriminator TTL pulse as an input.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8B is a graph illustrating unipolar shaping, according to an embodiment of the present invention.

FIG. 19C is a graph illustrating results for gamma dose rate measurements using the current channel with a special 0.5" by 4" long $^{10}$B detector with a 250 micron thick anode, according to an embodiment of the present invention.

DETAILED DESCRIPTION OF THE EMBODIMENTS

Some embodiments of the present invention pertain to improved, high count rate thermal neutron counters and electronics. Some embodiments include next generation $^3$He and $^{10}$B tubes with a new electronics package capable of operating at higher count rates and in higher gamma fields, as well as offering the possibility of more efficient use of $^3$He gas. Some embodiments can also be used by themselves to upgrade conventional detector systems, enabling a possible solution to measure spent nuclear fuel with high neutron efficiency previously not possible in systems that use $^{235}$U fission counters. Some embodiments include an optimized detector geometry and advanced electronics with double pulse filtering and a dual channel readout.

A bipolar shaper has been developed based on universal and adaptable front-end electronics for thermal neutron gas detectors with the goal of improving dead time, providing efficient detector use, reducing double pulsing, facilitating high count rate measurements, and allowing remote threshold setting. Application-specific electronics have been implemented in spent fuel measurements assay systems scheduled to be tested in 2017. A novel concept for expanding the spent fuel measurement range with the FORK detector has been developed. A novel concept of front end electronics with near Zero Dead Time (ZDT) based on a Gated Integrator (GI) has been developed. A proof of principle prototype has been built and proof of principle experimental results have been obtained. A method for direct self-calibration of dead time losses in neutron counting systems has been developed when using associated electronics and initial proof of experimental results has been obtained. A novel solution for gross neutron measurements with adaptive sensitivity and gamma tolerance based on a radiation-hard $^{10}$B neutron detector and electronics with remote sensitivity control has been developed and proof of principle experimental results has been obtained. A novel concept for expanding the dynamic range and accuracy for gross gamma direct current measurements has also been developed.

Amplification Stage and Compact High Order Bipolar Shaper

An analog front-end electronic unit in some embodiments is intended for use mainly with thermal neutron detectors, such as $^3$He and $^{10}$B-lined proportional counters, as well as $^{235}$U fission chambers for neutron counting systems where low dead time, tolerance to detector capacitance, compactness, reliability, etc. are critical. Such embodiments may also work with scintillation detectors for gross gamma and neutron counting.

Figure 1:
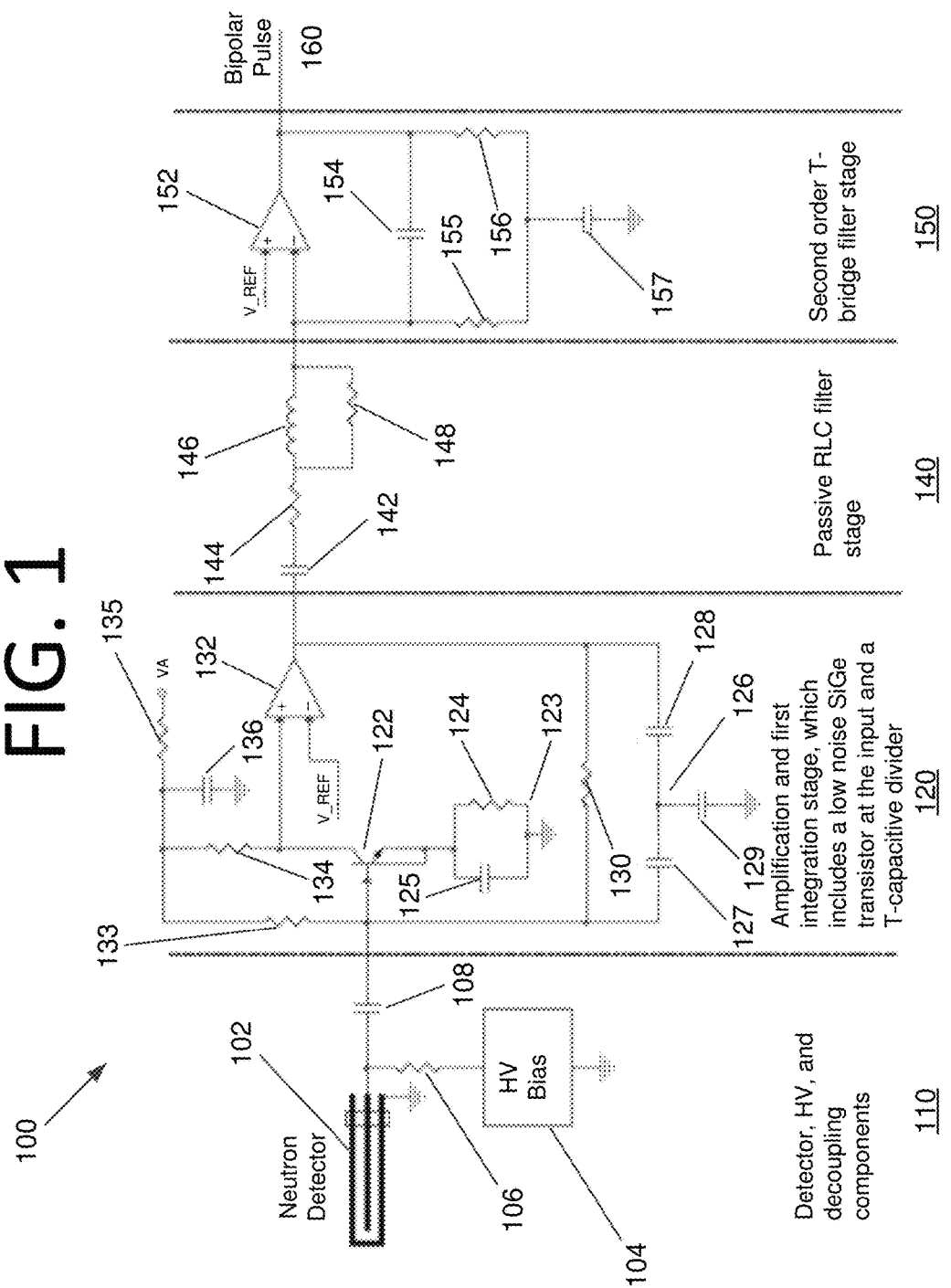
FIG. 1 is a circuit diagram illustrating an integrated low noise detector preamplifier and filter/shaper, according to an embodiment of the present invention.

FIG. 1 is a circuit diagram illustrating an integrated low noise detector preamplifier and filter/shaper circuit 100, according to an embodiment of the present invention. Circuit 100 includes a neutron detector interface stage 110 with a thermal neutron detector 102 connected to a high voltage (HV) supply 104 through a load resistor 106. Decoupling of other components from high voltage potential is achieved by passing the signal through a decoupling capacitor 108.

Circuit 100 also includes an amplification and first integration stage 120 with a novel use of discrete low noise and high speed SiGe transistor 122 at the input and a T-capacitive divider 126. Properly biased SiGe transistor 122 is connected directly to a positive input of operational amplifier 132 and through feedback via an RC integration stage that includes a resistor 130 and T-capacitive divider 126 that includes capacitors 127, 128, 129 and connects the output of operational amplifier 132 to the base of transistor 122. Using transistor 122 may avoid the higher noise of differential inputs of operational amplifiers by providing initial amplification with a low noise device at the input.

A novel aspect of some embodiments is the use of low noise SiGe transistor 122, which has been developed for wireless communications. Unlike high frequency silicon bipolar junction transistors (BJTs), which are typically used in such configurations, SiGe technology offers a much higher bandwidth at lower collector current with low current noise and higher current gain (β), which also leads to lower current noise and lower input capacitance while still providing low input voltage noise.

The values of the RC components in the preamplifier feedback loop determine the integration time constant of the preamplifier. In some cases, feedback capacitor 127 is connected directly to the detector to avoid signal loss due to charge division between the high voltage (HV) decoupling capacitor and the detector/cable capacitance.

When high amplification is needed, but a single feedback capacitor is used instead of a T-capacitive divider, the feedback capacitor should be on the order of 0.5 picofarads (pF) in some embodiments. Components with these values have tolerances of more than 20%, which translates to overall gain uncertainty. One way to mitigate component tolerances is to form the feedback as a trace buried in an internal layer of the printed circuit board (PCB). The disadvantage of this approach is that the capacitor will have a value that cannot be changed. Instead, some embodiments use a novel T-capacitive divider feedback network, as shown in capacitors 127, 128, 129. This network allows large value capacitors to be used that have precise tolerances to form a high amplification feedback network. Because the optimal current of transistor 122 depends on application requirements, such as noise power consumption, etc., and may thus vary substantially, the DC current and voltages of transistor 122 are stabilized by two local negative feedbacks resistor 124 and capacitor 125 in emitter 123 of transistor 122, and resistors 133, 134, 135 and capacitor 136 and in the base of amplifier 132. The values of resistor 124, capacitor 125, resistors 133, 134, 135, and capacitor 136 are selected to keep the DC voltage on the output of amplifier 132 around the middle of the $V_{CC}$ in order to avoid saturation at a high rate of the input signal.

Passive RLC filter stage 140 includes a capacitor 142, a first resistor 144, a second resistor 148, and an inductor 146. Passive RLC filter stage 140 forms a passive damped RLC network that provides a second order filter response before the additional integration in feedback to amplifier 152 in second order T-bridge filter stage 150. An additional advantage of RLC filter stage 140 is reduction of the signal bandwidth prior to amplification by amplifier 152, which reduces the bandwidth requirements and power consumption of amplifier 152. The component values in second order T-bridge filter stage 150 are selected to match other stages of the shaper and to provide the desired shaper impulse response. Second order T-bridge filter stage 150 includes amplifier 152, a first capacitor 154, resistors 155, 156, and second capacitor 157.

This filter uses a single operational amplifier 152 to provide second order system response without the use of inductors. The usual approach for filtering of $^3$He detector signals is based on a simple charge integrator in the first stage and a simple bipolar shaping filter ($CR^2$—$RC^2$), and may include compensation of slow time constants from the first stage (pole-zero cancelation). A higher order filter would require more active amplifiers.

The implementation of a bipolar pulse shaper of some embodiments uses a high order shaping filter with complex poles similar to ($CR^2$—$RC^4$) with only one active amplifier. This is accomplished by combining differentiation and integration functionality directly into amplification and first integration stage 120, followed by RLC passive differentiation in passive RLC filter stage 140, and active second order T-bridge filtering in second order T-bridge filter stage 150. The output of second order T-bridge filter stage 150 is a bipolar pulse 160.

Advanced Discriminator Hysteresis

Figure 2:
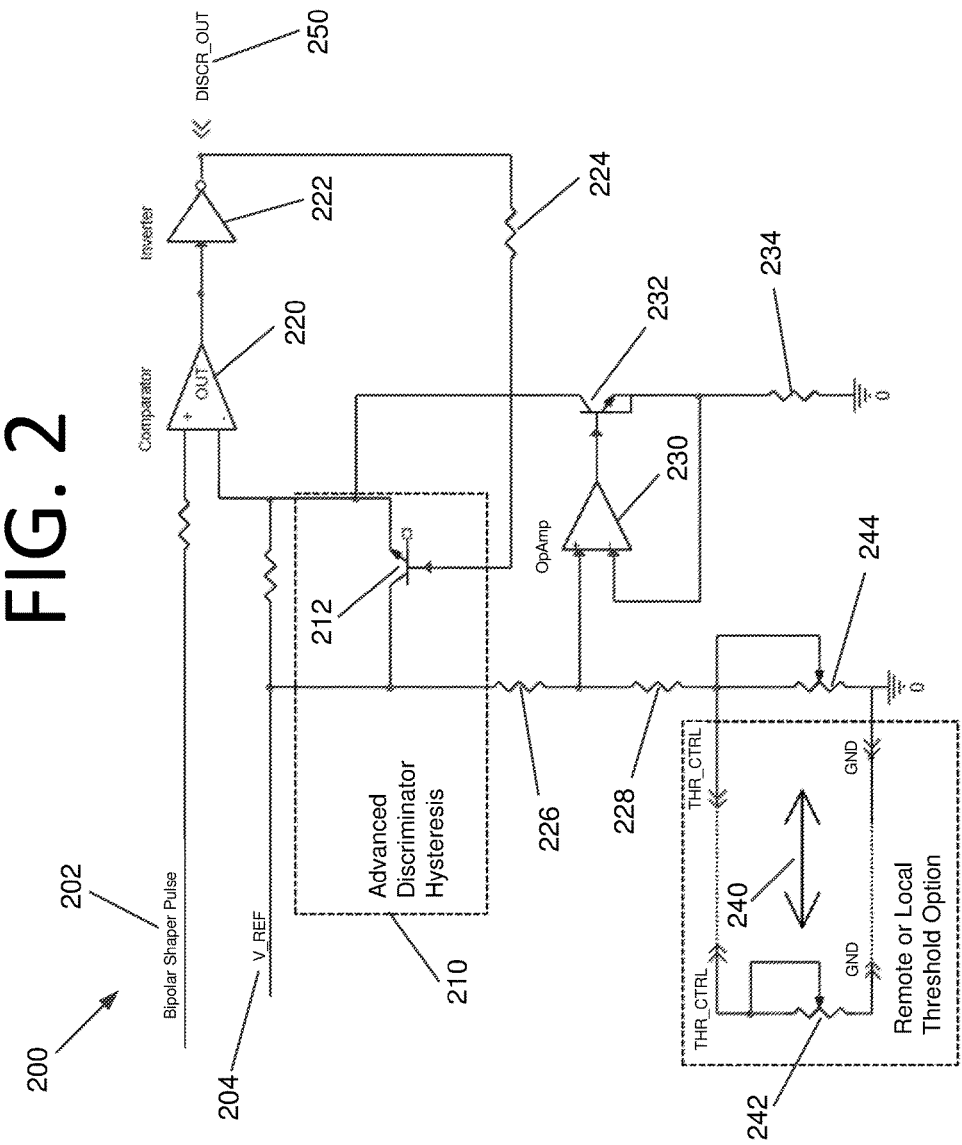
FIG. 2 is a circuit diagram illustrating an amplitude discriminator with advanced hysteresis and remote threshold capability, according to an embodiment of the present invention.

The discriminator stage of some embodiments implements a novel return-to-zero hysteresis approach, as illustrated in FIG. 2, which is a circuit diagram illustrating an amplitude discriminator 200 with advanced discriminator hysteresis 210, according to an embodiment of the present invention. Return-to-zero hysteresis may be performed by actively switching the threshold of comparator 220 from its detection value to zero when a pulse triggers comparator 220 and returning back to the detection value when the pulse crosses zero at the end of the first half of the wave of bipolar shaper pulse 202. This increases noise immunity, but more importantly, suppresses spurious comparator triggering due to pulse shape non-uniformity (double pulsing). The return-to-zero hysteresis is implemented with a transistor 212 used as a switch controlled by comparator 220 through an inverter 222. Transistor 212 is off and the threshold is set by the current that goes through resistor 224 when comparator 220 has low logic output. Transistor 212 is on and the threshold is set to V_REF 204, which corresponds to a threshold of zero, when comparator 220 has high logic output. The threshold of advanced hysteresis discriminator 210 is controlled by DC circuitry including a voltage divider made up of resistors 226, 228, a variable resistor network that can include remote potentiometer 242 connected via cable 240 or potentiometer 244, as well as a precise DC current generator (amplifier 230, transistor 232, and resistor 234). The output of amplitude discriminator 200 is DISCR_OUT 250.

The DC configuration allows remote threshold control by connecting remote potentiometer 244 with long cable 240. This remote threshold setting feature is very important for applications where the electronics are installed together with the detector in an inaccessible, hermetically sealed underwater enclosure. In this embodiment, the remote threshold control allows changing the sensitivity according to the measurement condition without opening the enclosure.

Pulse Width Inspection for Double Pulsing Suppression

Due to the nature of signal charge formation and application requirements, $^3$He counters suffer from spurious retriggering due to non-uniform rise time of the detector pulses. In a proportional counter like a $^3$He tube, the initial charge is formed when the gas inside the detector is ionized from interaction with radiation. The ionization track has random orientation and position relative to the collecting electrode. In the case of $^3$He tubes, the ionization density is largest at the two ends of the track (i.e., the Bragg peak).

As a result of the random orientation of the tracks, the collection of the charge happens at different rates. If the track is parallel to the anode wire, the generated electrons arrive at the anode at the same time, and the resulting detector pulse is fast. On the other hand, if the ionization track is perpendicular, then the time for the electrons to travel from different points on the track to the anode varies. The detector pulse is therefore stretched in time, with a varying slope corresponding to charge density along the track. This pulse is relatively slow.

Figure 3A:
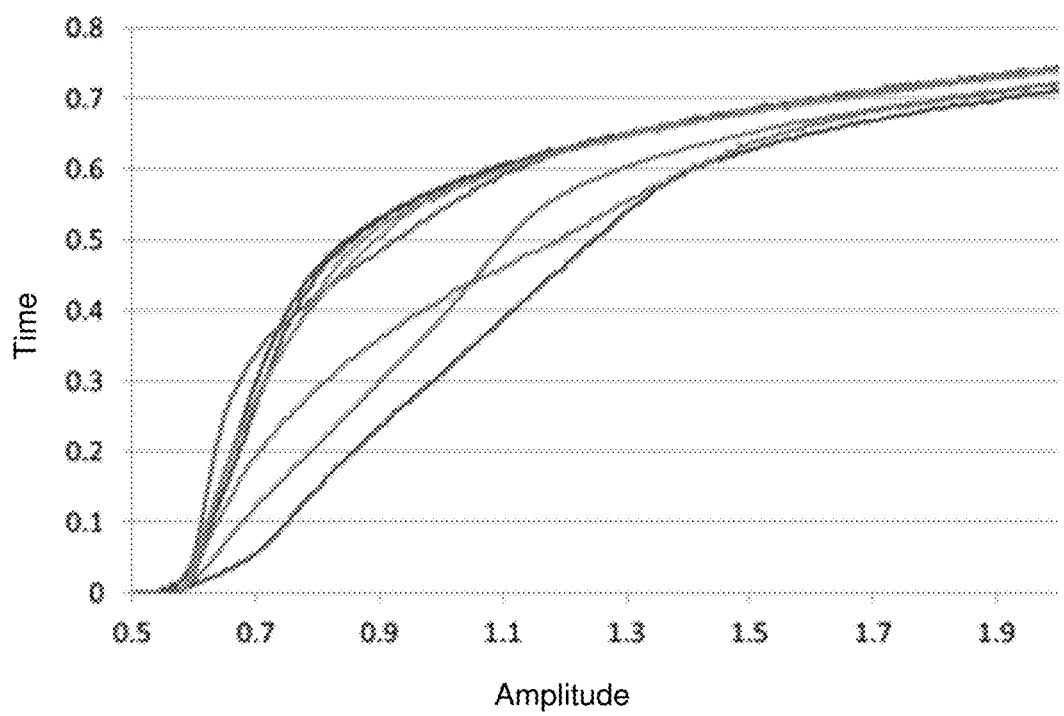
FIG. 3A is a graph illustrating a collection of integrated charge pulses from a $^3$He tube normalized to total charge, according to an embodiment of the present invention.
Figure 3B:
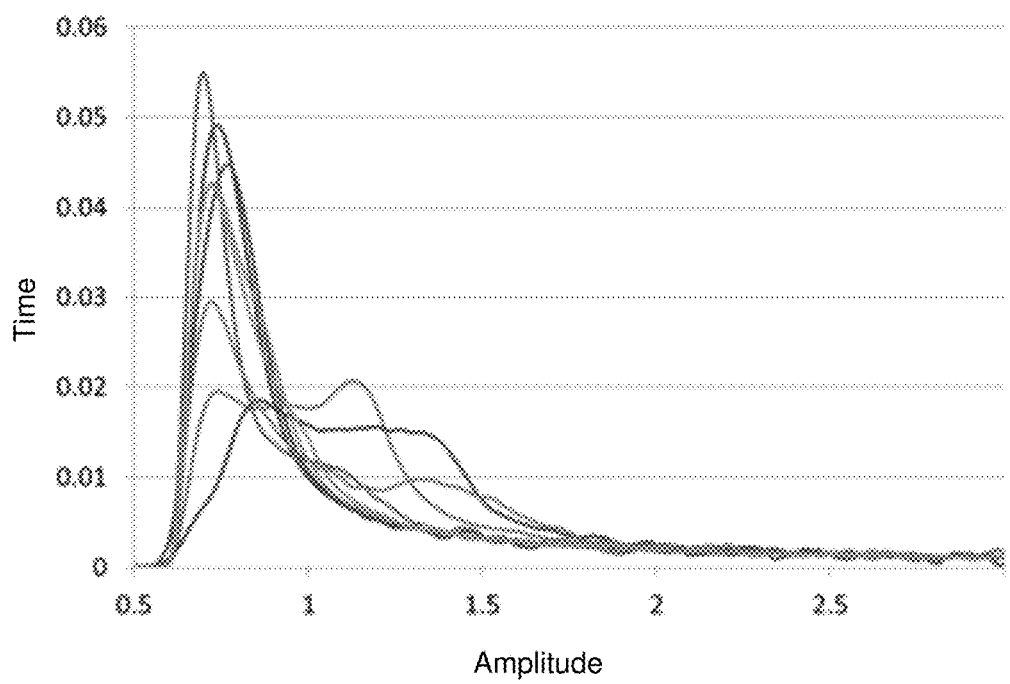
FIG. 3B is a graph illustrating the same detector pulses from FIG. 3A after a 20 nanosecond unipolar shaper, according to an embodiment of the present invention.
Figure 3C:
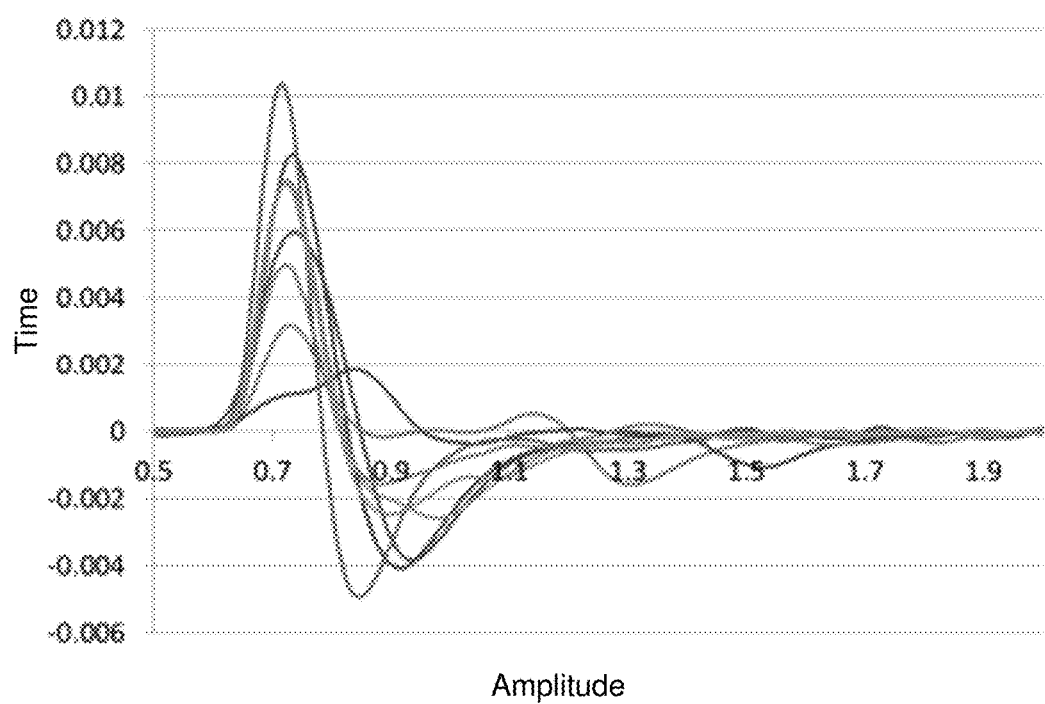
FIG. 3C is a graph illustrating the same detector pulses from FIG. 3A after a 20 nanosecond bipolar shaper, according to an embodiment of the present invention.

In neutron coincidence counting systems where $^3$He detectors are used, reducing dead time provides a significant benefit. Because of this, the pulse shapers used therein are fast, which results in a significant ballistic deficit. The ballistic deficit, in turn, causes the amplitudes of the shaped pulses to depend less on the total charge of the detector pulses, and more on their rise times. This effect is demonstrated on a collection of experimentally obtained integrated current pulses from an actual $^3$He detector normalized to a charge value at 20 ρs, as shown in graph 300 of FIG. 3A. The non-uniform rise times of these pulses ranging from a couple hundred nanoseconds to a couple of microseconds are obvious in graph 300. The normalized charge pulses were post processed with 20 nanosecond unipolar shapers (graph 310 of FIG. 3B) and bipolar shapers (graph 320 of FIG. 3C) to show the effect of detector charge collection time non-uniformity.

As can be seen, the non-uniformity of charge collection time leads to non-uniformity in the pulse height distribution of the shaped signals, where high amplitude but short pulses correspond with a parallel charge track and low amplitude but long pulses with fluctuation correspond to a perpendicular charge track. Because the used shaping time constants are much shorter than the detector current pulse, a serious problem occurs when the "wiggling" of the shaped pulses results in the discriminator threshold being crossed twice during the duration of a single pulse. This so-called double pulsing is exacerbated when shapers are too fast. The occurrence of double pulsing in an actual bipolar-shaped $^3$He pulse and a strategy to suppress it are illustrated in graphs 400 of FIG. 4.

Figure 4:
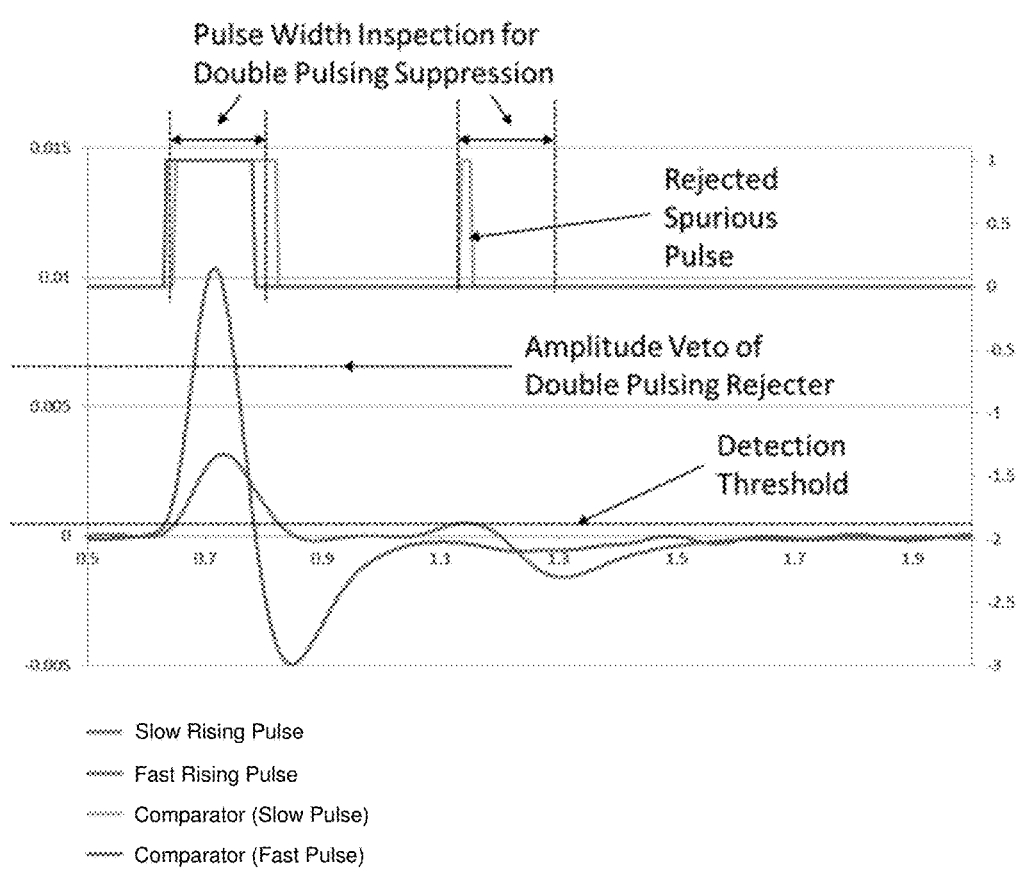
FIG. 4 illustrates graphs of a double pulsing phenomenon due to pulse non-uniformity and a suppression strategy using pulse width inspection, according to an embodiment of the present invention.

In addition to the return-to-zero threshold switching described in the previous section above, some embodiments employ a novel pulse width inspection circuit for double pulsing suppression (see FIG. 4). The idea is that when the comparator retriggers due to a non-uniform pulse crossing the detection threshold a second time, the duration of the second pulse will be shorter than the main pulse. The pulse width inspection (PWI) circuit of some embodiments rejects shorter pulses, thus preventing double pulse events from being output. Some legitimate detector pulses are fast and may be rejected by the pulse width inspection. This problem may be solved by using the fact that fast pulses always have high amplitude. A second, higher threshold may be used to veto the rejection mechanism and let fast real detector pulses through.

Figure 5A:
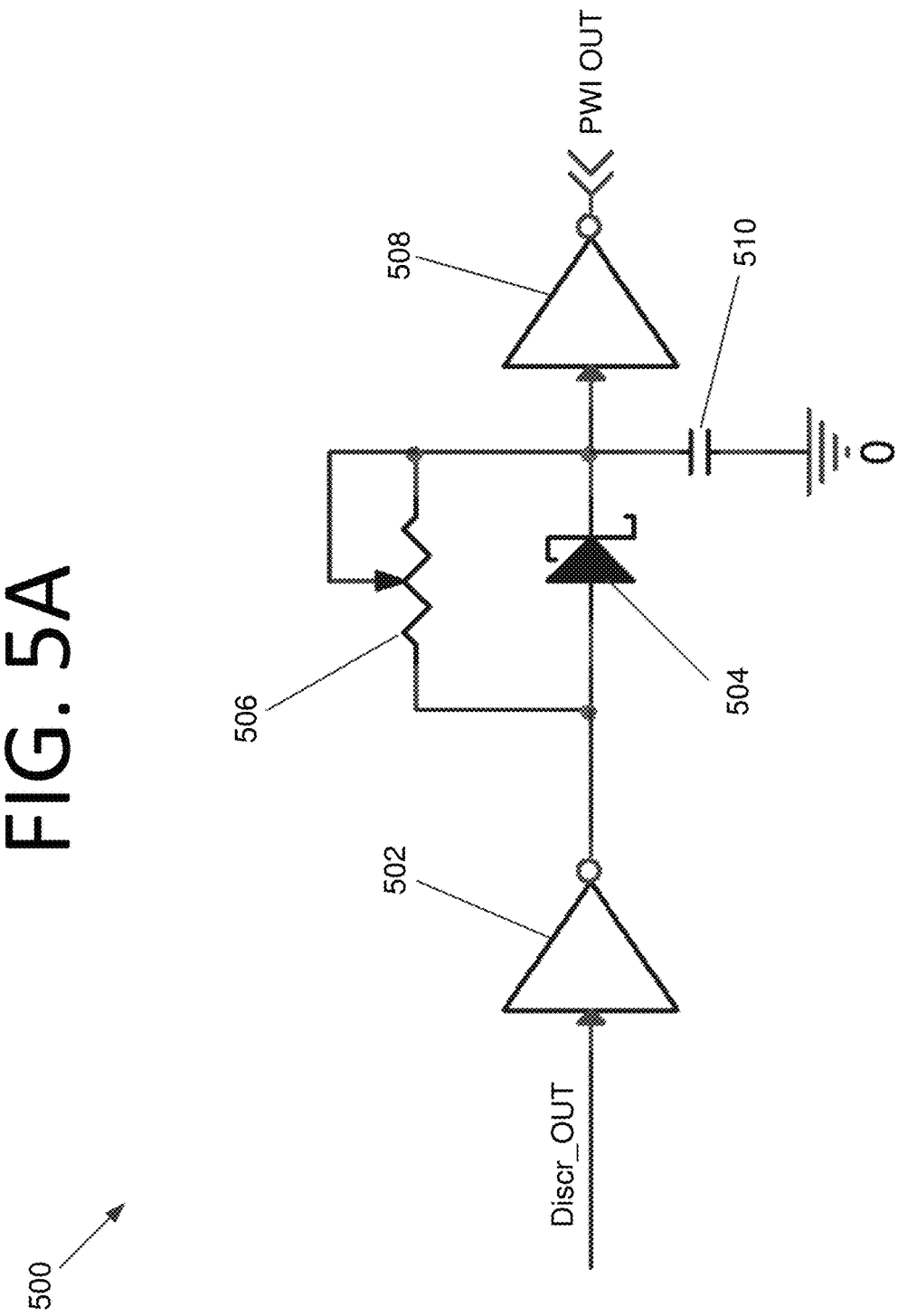
FIG. 5A is a circuit diagram illustrating a double pulse filtering circuit based on discriminator logic pulse width inspection using a diode, according to an embodiment of the present invention.
Figure 5B:
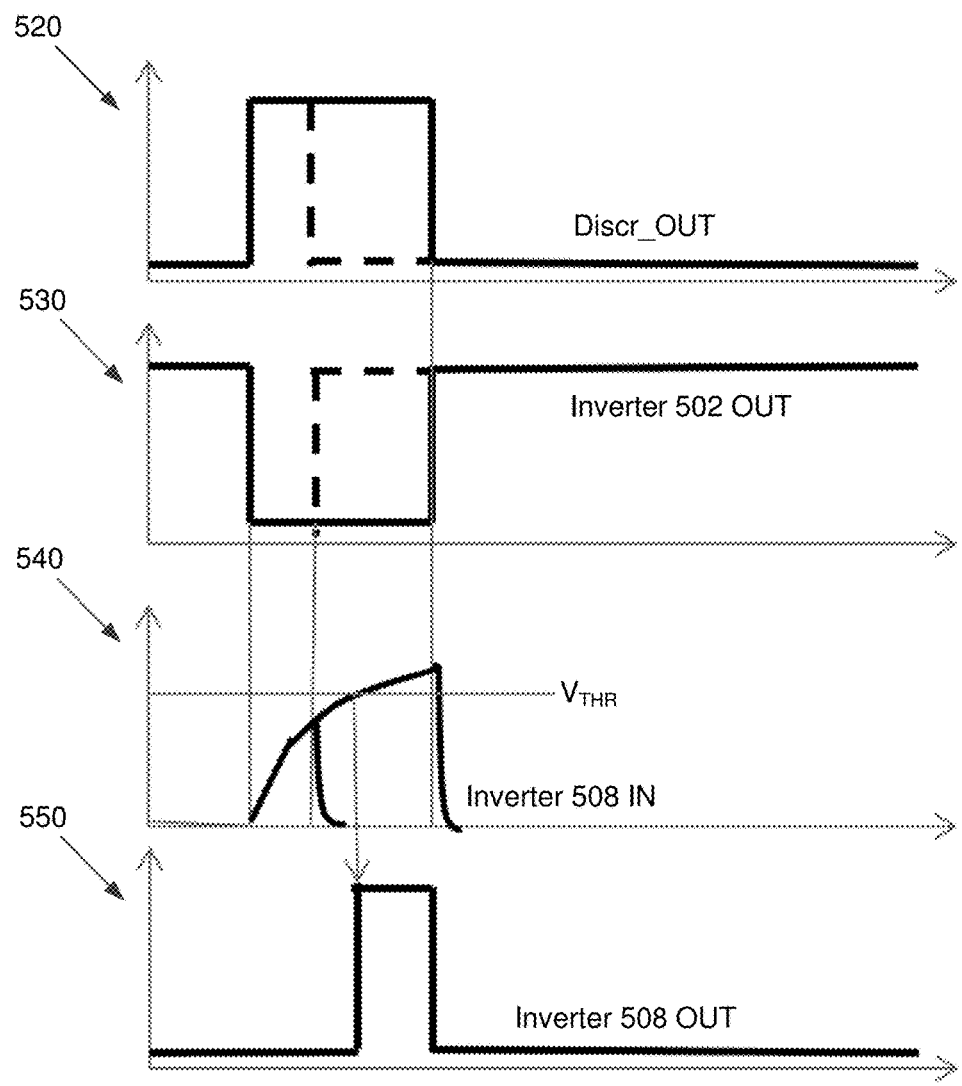
FIG. 5B illustrates pulses of components of the circuit of FIG. 5A, according to an embodiment of the present invention.

PWI circuitry may be implemented in various ways. For instance, FIG. 5A is a circuit diagram illustrating a double pulse filtering circuit 500 based on discriminator logic pulse width inspection using a Schottky diode 504 after passing through a first inverter 502, according to an embodiment of the present invention. Passive R-C integration circuitry includes a potentiometer 506 and a capacitor 510. In this embodiment, the R-C integration circuitry converts the fast leading edge of the discriminator TTL pulse DISCR_OUT into an exponentially rising voltage on capacitor 510 equal to $V_{CC}*\exp(-R*C)$, where R is the resistance of potentiometer 506 and C is the capacitance of capacitor 510. The time constant R*C is selected in such a manner that the voltage on the input of a second inverter 508 could reach the inverter switching threshold only if the duration of the comparator logic pulse is greater than the duration of the parasitic spurious pulses. Therefore, as is shown in component pulse timing diagrams 520, 530, 540, 550 in FIG. 5B, the short pulse will reach the inverter threshold of inverter 508, and thus will be filtered. Schottky diode 504 discharges capacitor 510 quickly after the duration of the discriminator pulse DISCR_OUT, and thus, clears double pulse filtering circuit 500 for the next neutron pulse.

Figure 6A:
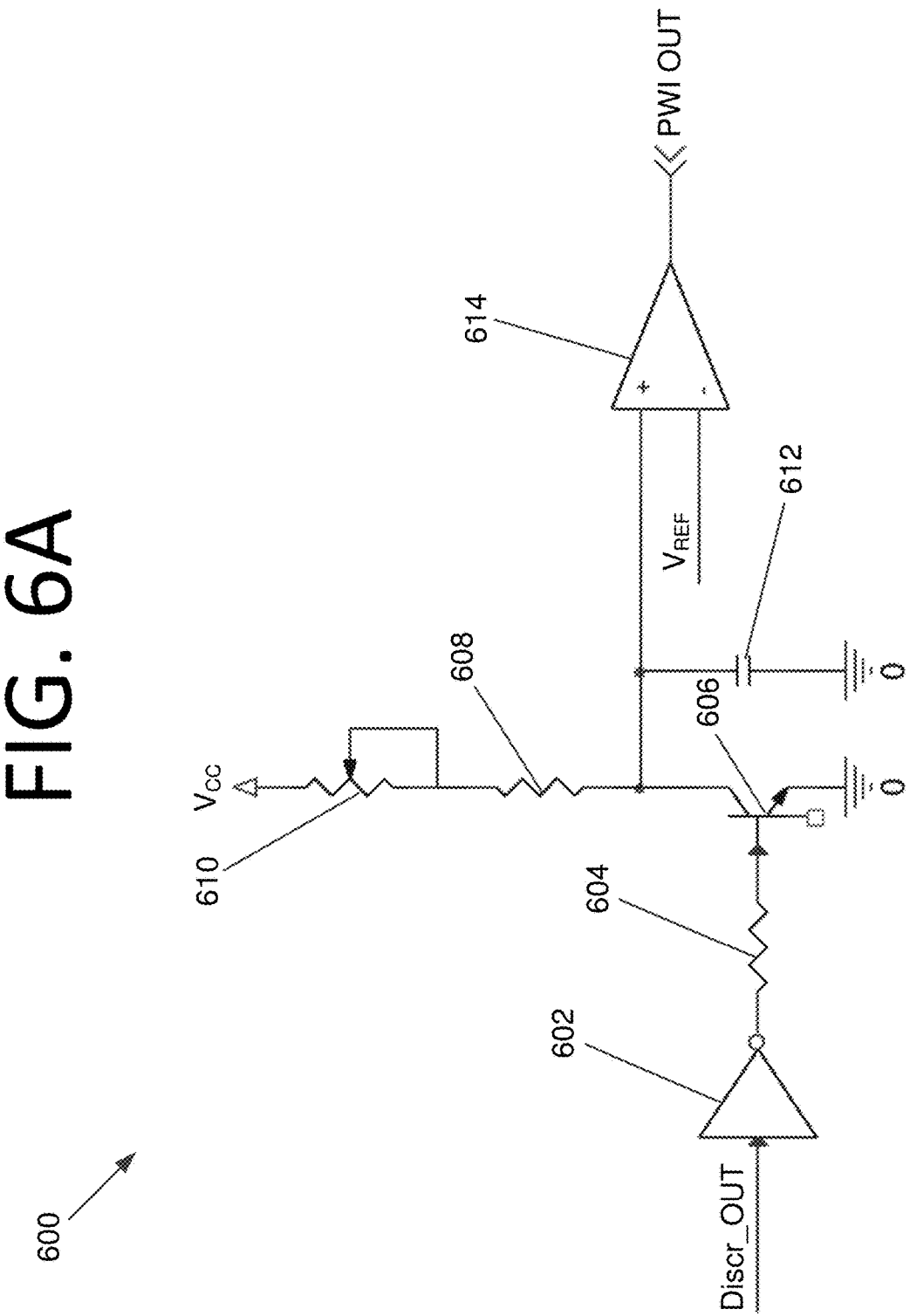
FIG. 6A is a circuit diagram illustrating a double pulse filtering circuit based on discriminator logic pulse width inspection using a transistor switch, according to an embodiment of the present invention.
Figure 6B:
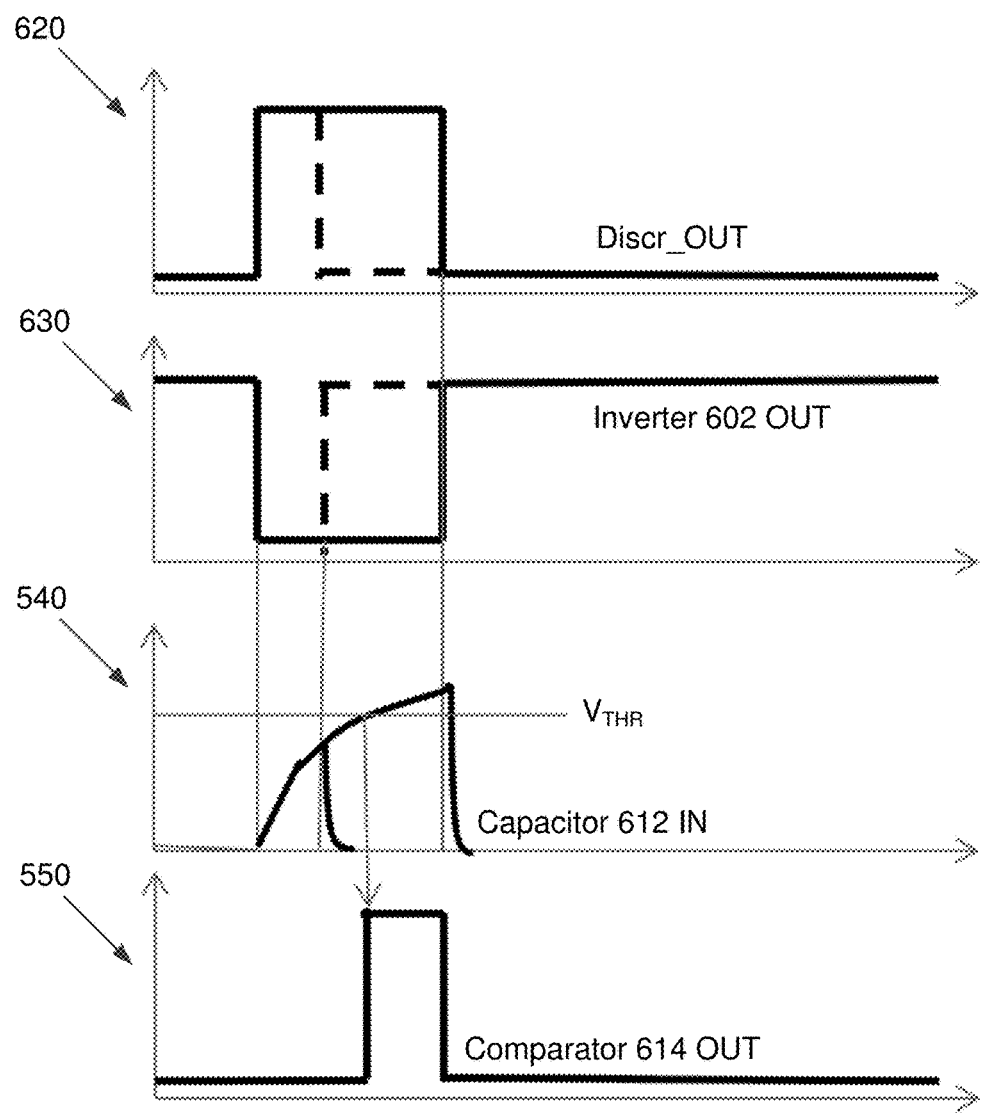
FIG. 6B illustrates pulses of components of the circuit of FIG. 6A, according to an embodiment of the present invention.

Double pulse filtering circuit 600 of FIG. 6A has the same functionality, and also uses an inverter 602 akin to inverter 502 in FIG. 5A. However, circuit 600 uses a transistor 606 as a transistor switch that is open only for the duration of the discriminator pulse DISCR_OUT and is connected in parallel to capacitor 612. Resistors 604 convert the voltage pulse from the inverter to a current pulse that controls bipolar transistor switch 606. Resistors 608 and potentiometer 610 determine the capacitor current and slope, respectively, of voltage pulse 540 and the width of minimal discriminator pulse 520 that produce signal 550 on comparator 614. See FIG. 5B. Comparator 614 provides more stable and accurate performance of the PWI. Resistor 604 limits the current through the base of transistor 606 when transistor 606 is turned on. Resistor 608 sets the minimum rise time of the voltage at the input of comparator 614. FIG. 6B illustrates timing diagrams 620, 630, 640, 650 of the component pulses.

Double Pulsing Suppression with Gated Integrator (GI)

The suppression of parasitic double pulsing described above is based on filtering of the duration of the secondary pulses. In addition to shorter duration, the spurious pulses also have much lower amplitude than the primary pulse. This suggests that filtering based on the value of the time integral of the positive half wave of the bipolar shaped pulses provides a more powerful distinction between real and spurious pulses than a simple pulse width inspection. Technically, this principle can be implemented by use of a gated integrator (GI) that integrates the positive pulse for the duration of the discriminator pulse and an additional discriminator for separation of real neutron events from double pulsing events.

Multifold benefits may be derived from implementation of this principle in some embodiments, including, but not limited to, additional reduction of shaping time and dead time without the penalty of double pulsing, eliminating the need for the double pulsing rejection adjustment, and/or use of one preamplifier for all types of tubes. The purpose of implementation of a GI with a bipolar shaper is only to improve and simplify the double pulse rejection in some embodiments, not to recover the pulse pile-up events, as described later herein.

Figure 7:
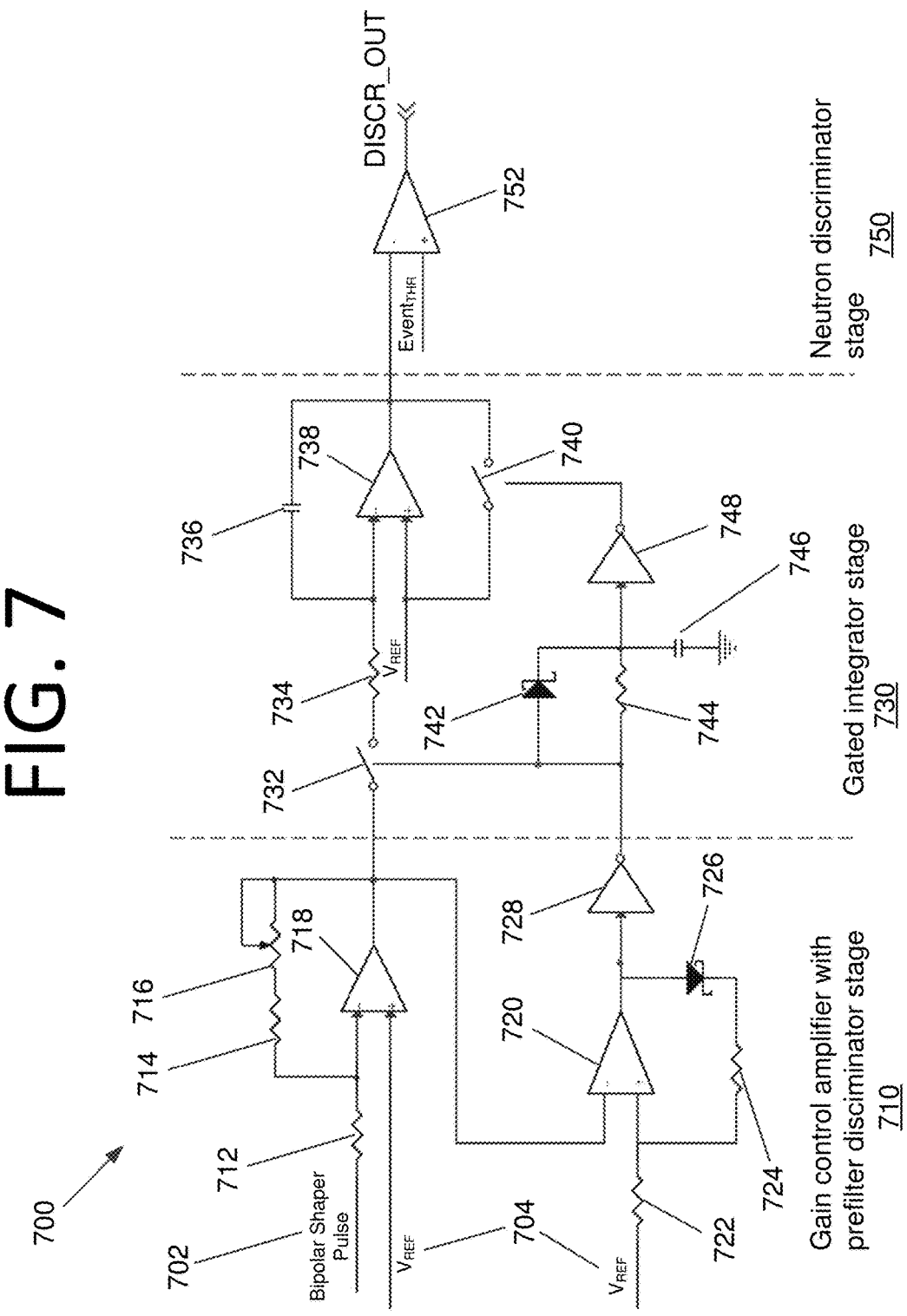
FIG. 7 is a circuit diagram illustrating a circuit that provides more advanced double pulsing filtering for bipolar shapers based on amplitude discrimination of the area of the of bipolar pulse, according to an embodiment of the present invention.

FIG. 7 illustrates a double pulsing suppression filter 700 that uses GI for rejection of spurious pulses by integrating the first half wave of a shaped bipolar pulse 702, according to an embodiment of the present invention. Bipolar shaped pulse 702 is amplified by operational amplifier 718 with adjustable gain controlled by resistors 712, 714 and potentiometer 716. Adjustable gain amplifier 718 controls the detection sensitivity of gain control amplifier with prefilter discriminator stage 710. The output of amplifier 718 is connected to a comparator 720, which detects when a pulse (spurious or not) begins. Resistors 722, 724 and diode 726 provide hysteresis that keeps comparator 720 from being triggered by noise, but allows it to sense when the signal returns back near the value $V_{REF}$.

When comparator 720 detects the start of a pulse, the comparator signal (through inverters 728 and 748) closes switch 732 and opens switch 740 in GI stage 730, which connects the shaped detector signal to an integrator. The integrator includes operational amplifier 738, resistor 734 and capacitor 736. The integrator is gated (turned on and reset) by switches 732 and 740 that are indirectly controlled by comparator 720.

When switch 732 is closed, the integrator performs time integration of the shaped detector signal and outputs the result at the output of amplifier 738. When the first half wave of the bipolar pulse ends, comparator 720 opens switch 732, which ends the integration. The integrator result is held at the output for a period of time determined by how long the charge in capacitor 746 injected through diode 742 during the integration takes to be discharged through resistor 744. After this period, switch 740 closes, resulting in a reset of the integrator to value $V_{REF}$. Comparator 752 of neutron discriminator stage 750 triggers if the value of the integrator crossed a fixed threshold Event$_{THR}$ during the integration. If the integral of first half wave of the bipolar-shaped detector pulse was sufficiently large in amplitude, comparator 752 detects it as a legitimate neutron pulse and outputs this as DISCR_OUT.

Figure 8A:
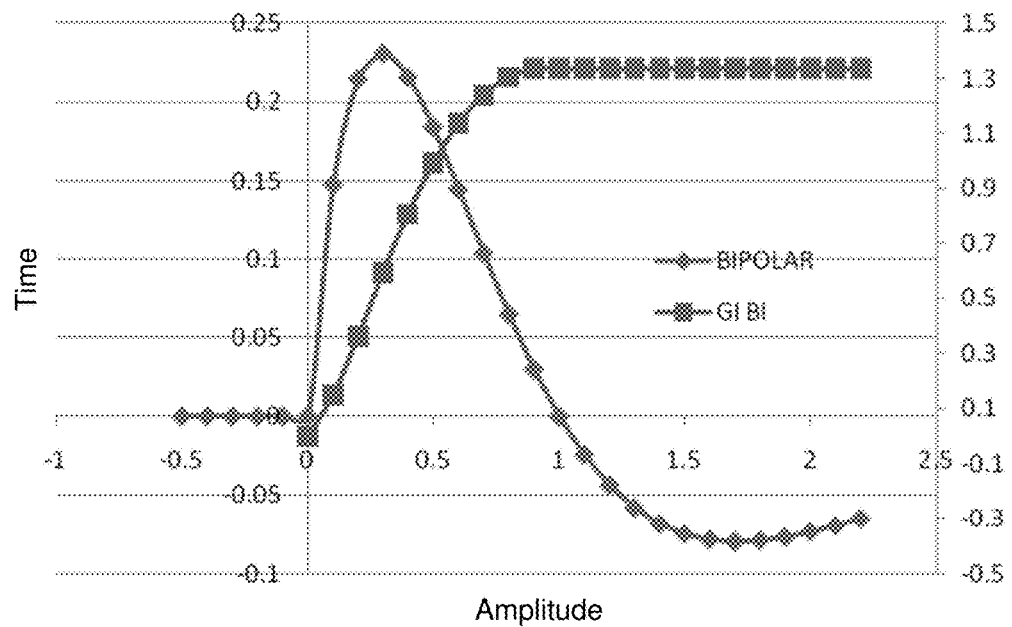
FIG. 8A is a graph illustrating a timing diagram of a bipolar pulse and its integrated positive half-wave, according to an embodiment of the present invention.

Graph 800 of FIG. 8A shows the output waveform of the GI before reset. Graph 810 of FIG. 8B shows how the integral would look if there was no gating of the integration. The rise time of the gated integrator is much shorter than the full duration of the ungated integrator.

Figure 16:
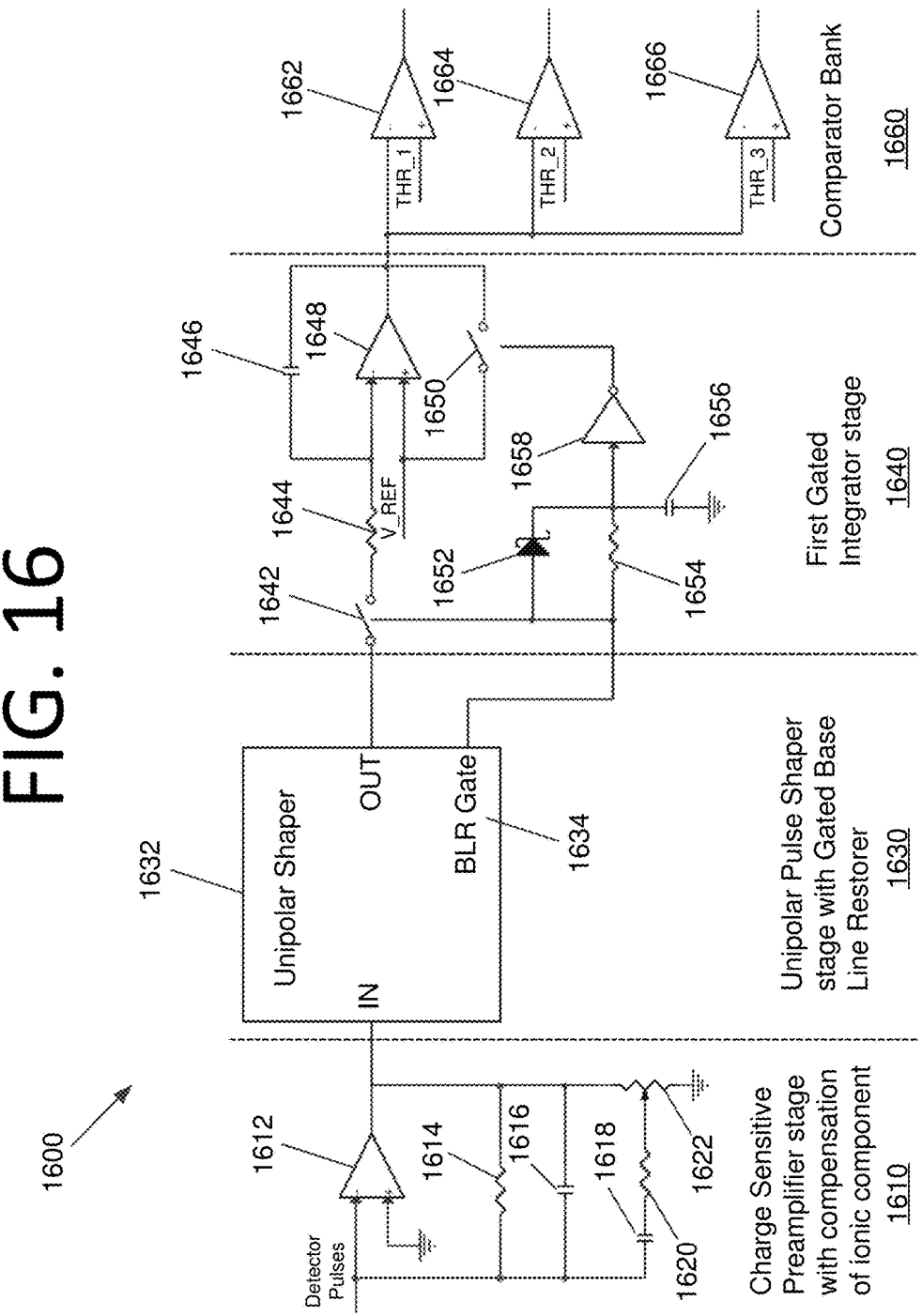
FIG. 16 is an example functional diagram illustrating electronics for zero dead time counting that produces GI pulses where 0, 1, 2, 3, etc. pile-up events can occur, according to an embodiment of the present invention.

Improved double pulsing suppression can be achieved by using the area instead of the amplitude of the positive wave of the bipolar pulse for further amplitude discrimination. Because the artifact signals causing double pulsing (see FIG. 4) not only have a shorter duration, but also a smaller amplitude, the area of the pulse is less sensitive to double pulsing. The gated integrated circuitry used for obtaining the area of pulse 1640 and amplitude discriminator 1660 are shown in FIG. 16.

Double Threshold

Dead time losses cause proportional counters to detect less than the actual event rate when the radiation intensity is high. In order to provide a correction factor for these losses, some embodiments have two parallel shaper channels. One shaper channel (arbitrarily denoted herein as a "first channel") has normal shaping time and full detection efficiency and the other channel (arbitrarily denoted herein as a "second channel") has a fast shaper, a high detection threshold, and a lower detection efficiency. The second channel only detects the fastest pulses and ignores the rest in some embodiments, which provides minimal dead time (DT). At high count rates, the second (fast) channel has much smaller DT losses then the first channel (i.e., the standard channel). However, the ratio of the detection efficiencies between the two channels remains constant. This allows a calibration coefficient to be found for the first channel at high count rates by finding the factor that restores the count rate ratio between the two channels. The concept is illustrated in graph 900 and architectural diagram 1000 of FIGS. 9 and 10.

Figure 9:
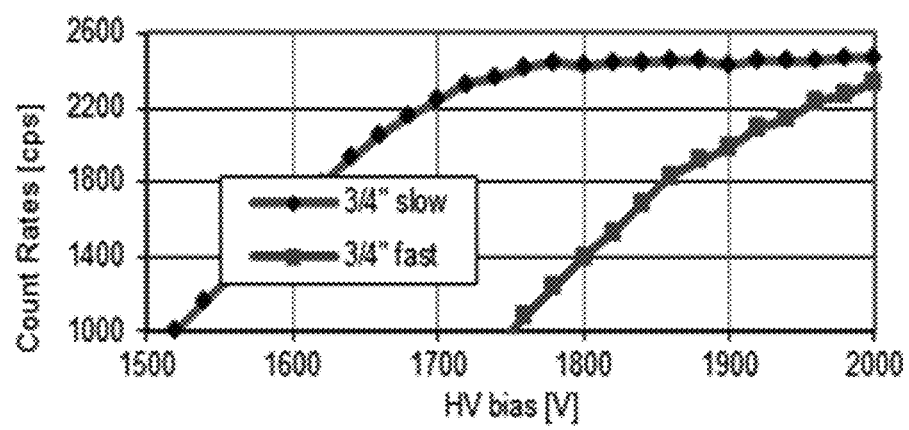
FIG. 9 is a graph illustrating detection efficiencies of standard (slow) and fast channels as they vary with supply voltage, according to an embodiment of the present invention.

FIG. 9 is a graph 900 illustrating detection efficiencies of standard (slow) and fast channels as they vary with supply voltage, according to an embodiment of the present invention. More specifically, count rates are shown for a given high voltage (HV) bias. In FIG. 9, ¾" is the tube diameter. For a set high voltage, the detection efficiencies have a constant ratio regardless of the incoming count rate.

Figure 10:
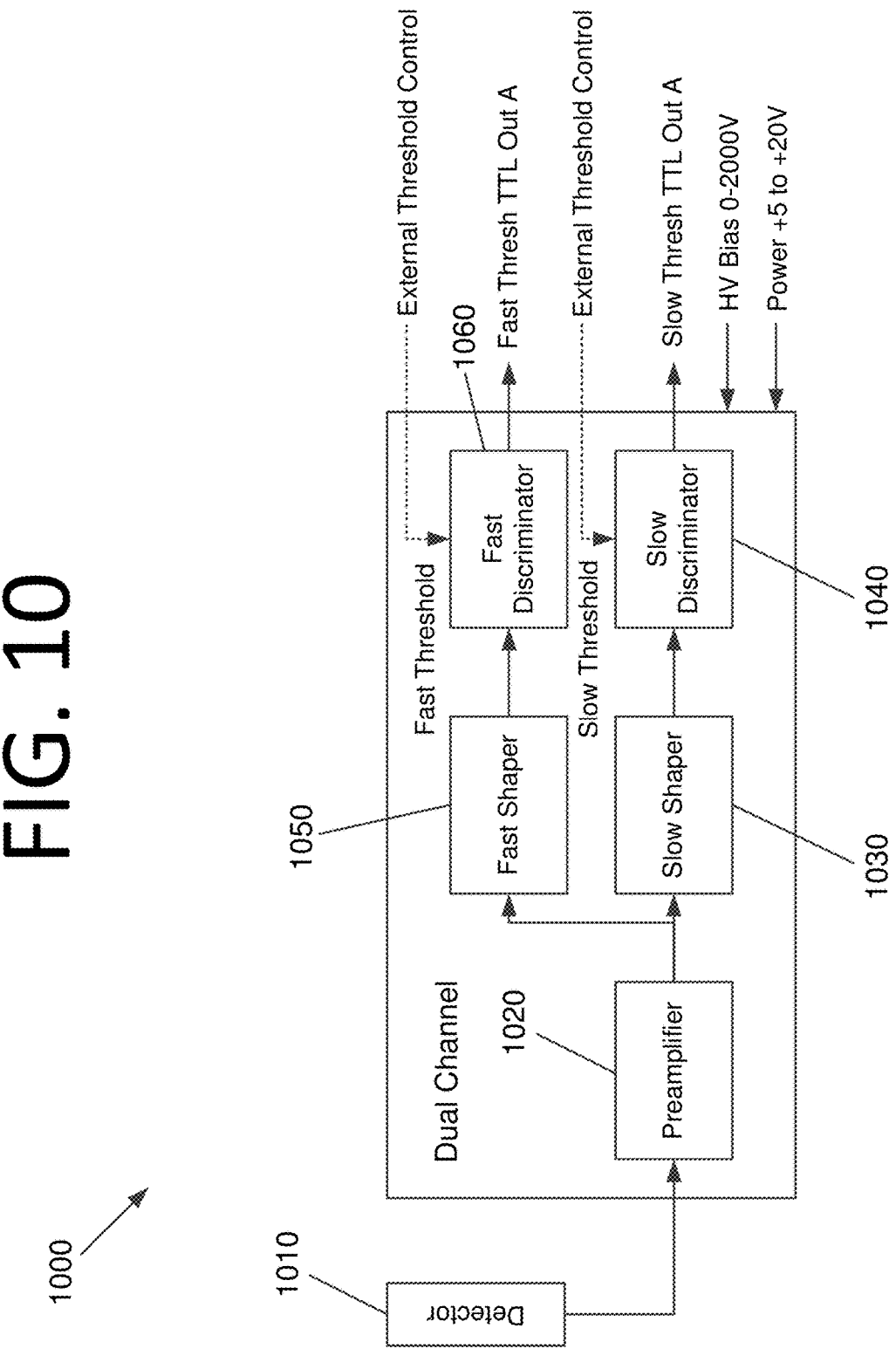
FIG. 10 is an architectural diagram illustrating a double threshold architecture with remote threshold adjustment, according to an embodiment of the present invention.

FIG. 10 is an architectural diagram illustrating a double threshold architecture 1000 with remote threshold adjustment, according to an embodiment of the present invention. The signal generated by detector 1010 is amplified by preamplifier 1020. The amplified signal is split into two, and fed to two independent channels. The slow channel has a shaper 1030 with a normal shaping time constant. The shaped pulses are sent to this channel's discriminator 1040, which outputs logic pulses when it detects a shaper pulse with amplitude and duration corresponding to a neutron pulse. The preamplifier signal is also routed to the fast channel. First, the signal goes to a shaper 1050 with a fast time constant. The filtered signal then goes to a discriminator 1060 that has a threshold setting that only detects neutron pulses that generated parallel tracks (i.e., fast neutron pulses).

Both channels' thresholds in the dual threshold architecture can be set by potentiometers wired with cables of significant length, allowing threshold setting at a distance from the device. This remote threshold setting is an important feature of some embodiments of the present invention.

Remote Threshold Adjustment

The design of some embodiments allows exporting the threshold adjustment away from the electronics set. This is a useful feature when the device is hard to access after installation, and there is a need for recalibration or altering the measurement in some way. The remote threshold capability of some embodiments is not limited to the double threshold architecture.

Self-Calibration Method for Dead Time Losses in Neutron Counting Systems

Most safeguards assays for quantitative characterization of special nuclear materials (SNM) (e.g., mass, multiplication, random neutron contribution, etc.) are based on neutron measurements due to the high efficiency and stability of $^3$He proportional counters. The response of neutron detection systems is inevitably affected by dead time losses that are generally caused by very complex and convoluted processes, which are difficult to take into an account. Accordingly, an empirical approach for calculating the dead time losses using measurements with two Cf-252 sources with close activities was established as a current practice for the safeguards neutron counting systems. The availability of a wide range of such Cf-252 calibration sources becomes the limiting factor for extending the dead time correction calibration over a wide dynamic range. For example, the recently developed Improved Plutonium Canister Assay System (IPCAS) detector is intended to measure plutonium and MOX storage canisters with expected count rates of up to $1.8 \times 10^6$ counts per second (c/s) (or about 150,000 c/s per preamplifier for 12 preamplifiers in the system), which was estimated to correspond to dead time losses of 25%. To evaluate the dead time correction based on the traditional method, a pair of Cf-252 sources with total activity of ~200,000 neutrons per second (n/s) would be used that only includes a small fraction of the nominal measurements range. Another example is multiplicity measuring of high mass samples where the count rate losses affect the calibration and accuracy of measured material. The reliance of the present dead time calibration approach on a single measurement point therefore introduces potential limitations, such as difficulty finding and measuring paired Cf-252 sources in the entire dynamic range of the detection system, different count rates and neutron correlation characteristics of the Cf-252 calibration source from those of the SNM, and convoluted and non-constant dead time behavior of the detectors and electronics at high count rates, which thus can differ from calculated dead time at low or moderate count rates.

To address these limitations, a novel self-calibrating approach to directly extract dead time correction for each measured sample is provided by some embodiments. The approach may rely on a relatively minor hardware modification that can be implemented by design in future detector developments or retrofitted to existing detection systems. The approach for correction of dead time losses of some embodiments directly uses the neutron signal from measured material. The count rate from the material may be measured with two configurations of the preamplifiers: (1) a standard configuration of the preamplifiers and tubes corresponding to a nominal (100%) load per preamplifier; and (2) a dead time measurement configuration, where every two neighboring clusters of $^3$He tubes are connected together to a single preamplifier, corresponding to a 200% load per preamplifier. The system dead time along with dead time corrected neutron detection rates can be found analytically from the measured singles rates $N_{S100\%}$, $N_{S200\%}$ from these two measurements. There are different implementation modalities of this approach, including direct correction of singles only dead time losses for the particular measurement material and direct dead time calibration and correction for coincidence and multiplicity counters for singles, double, triples, or higher order multiplets taking into account the specifics of the measured material. As an example, the analytical expressions for dead time $t_D$ and dead time corrected singles counts per detector $N_{IN}$, if the two measurements were performed at 100% and 200% load per amplifier, are as follows:

$$N_{IN} = 2\frac{N_{S100\%}^2}{N_{S200\%}} \quad (1)$$

$$t_D = \frac{N_{S100\%}^2}{2N_{S200\%}} \ln\left(2\frac{N_{S100\%}}{N_{S200\%}}\right) \quad (2)$$

Figure 11A:
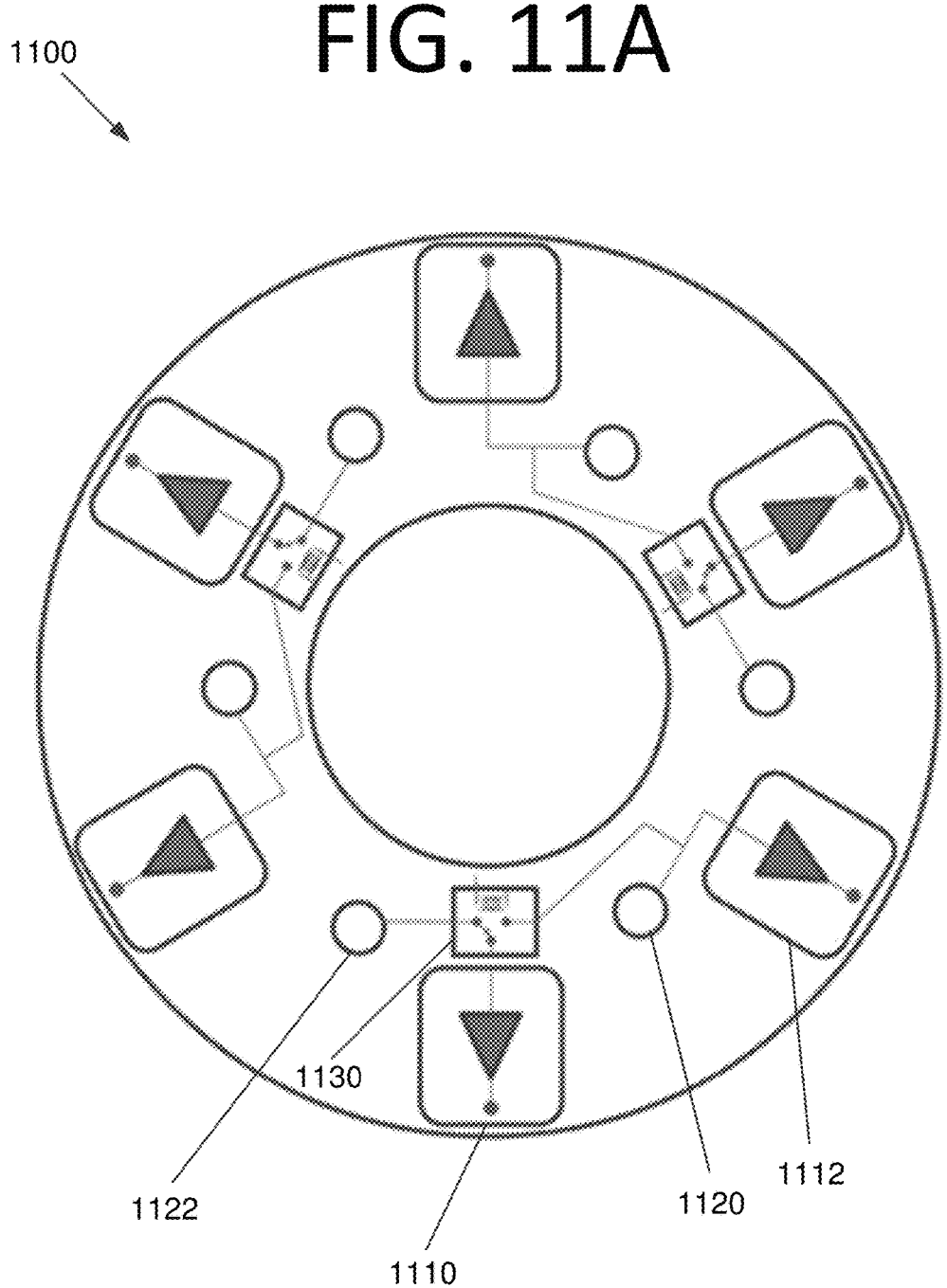
FIG. 11A is an architectural view of a preamplifier configuration that performs self-calibration of dead time losses, according to an embodiment of the present invention.

FIG. 11A is an architectural view of a preamplifier configuration 1100 that performs self-calibration of dead time losses, according to an embodiment of the present invention. In this embodiment, preamplifier configuration 1100 is for a neutron multiplicity counter for an accurate measurement of the mass of SNMs, such as $^{235}U$, $^{239}Pu$, etc. In this architecture, a first set of detectors 1120 are directly connected to a second preamplifier/shaper/discriminator channel 1112 (preamplifier/shaper/discriminator channels are hereinafter referred to as "preamplifiers"). A second set of detectors 1122 are connected to a relay 1130. The same number of detectors are present in first set of detectors 1120 and second set of detectors 1122, and the detectors are symmetrically positioned. Relay 1130 can switch the signal of second set of detectors 1122 between a first preamplifier 1110 and second preamplifier 1112. When second set of detectors 1122 is switched to first channel 1110, the count rate load per channel is 100%. When second set of detectors 1122 is switched to second channel 1112, the count rate load per channel is 200%.

The hardware modification envisions installation of three relays after the decoupling capacitors (e.g., decoupling capacitor 108 of FIG. 1) just before the preamplifiers. The relays will switch the low voltage side of the preamplifier input signal. Thus, standard low power, low voltage relays may be used. The coils of all relays are tied together and controlled by a toggle switch (switching between standard and dead time measuring state) installed outside the junction box (not shown in the diagram for simplicity). This modification is straightforward and may be performed by a technician on site.

Figure 11B:
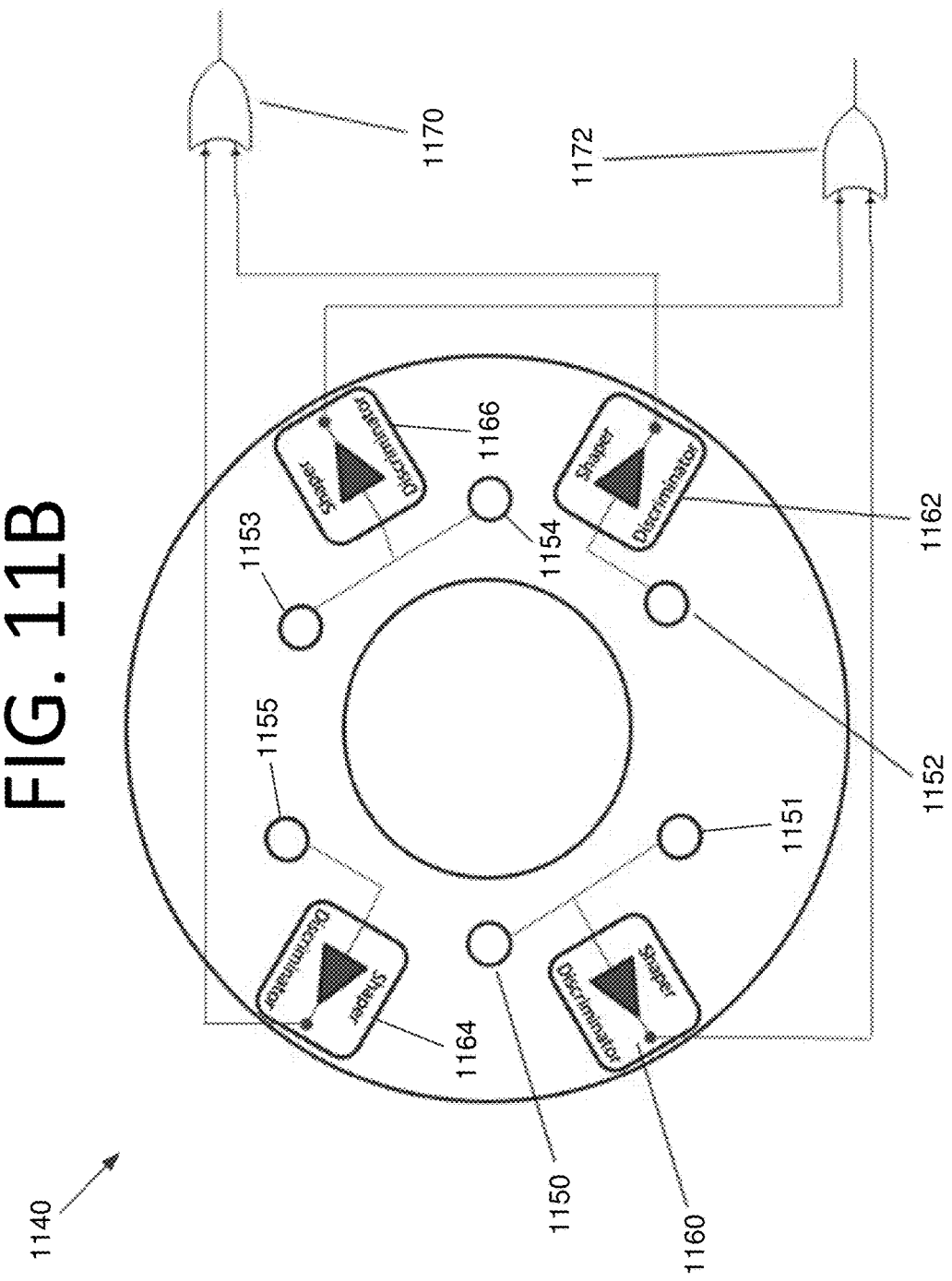
FIG. 11B is an architectural view of a preamplifier configuration that performs self-calibration of dead time losses without the need for detector switching, according to an embodiment of the present invention.

A preamplifier configuration 1140 that performs the self-calibration of dead time losses without the need for detector switching is shown on FIG. 11B. Here, a group of two detectors 1150, 1151 is permanently connected to a preamplifier 1160, which amplifies the signals from detectors 1150, 1151. Similarly, a group of two detectors 1153, 1154 is permanently connected to a preamplifier 1166, which amplifies the signals from detectors 1153, 1154. Independently, single detector 1152 is connected to preamplifier 1162 and single detector 1155 is connected to preamplifier 1164. All outputs of preamplifiers 1160, 1162, 1164, 1166 in preamplifier configuration 1140 are summed through OR logic gates 1170, 1172. More specifically, outputs of single detector preamplifiers 1162, 1164 are summed through OR logic gate 1170 and outputs of paired detector preamplifiers 1160, 1166 are summed through OR logic gate 1172.

Because there are two detectors per preamplifier for preamplifiers 1160, 1166, the output count rate at OR logic gate 1172 is equal to $N_{S200\%}$. Because there is one detector per preamplifier for preamplifiers 1162, 1164, the output count rate at OR logic gate 1170 is equal to $N_{S100\%}$. Having permanent detector connections allows the count rates for $N_{S100\%}$ and for $N_{S200\%}$ to be available in parallel and in the same measurement.

The measured count rates of singles, doubles, triples, quadruples, etc. (S, D, T, Q, etc.) for the two hardware configurations (i.e., 100% load for standard and 200% load for dead time) may be used to extract and correct for dead time losses. Two possible methodologies may be applied in some embodiments: (1) extrapolation of dead time free count rates from the slope of the measured count rates for 100% and 200% load; and (2) an iterative procedure to extract and correct for dead time losses. The former approach relies on linearity of the count rate variation with preamplifier load, which may be explored and confirmed experimentally. For more complex situations, where nonlinearities in count rate variation with preamplifier load are observed, the iterative approach may be used. The iterative approach may use the ratios $$\frac{S_{100\%}}{S_{200\%}}, \frac{D_{100\%}}{D_{200\%}}, \frac{T_{100\%}}{T_{200\%}}, \frac{Q_{100\%}}{Q_{200\%}}$$

that, if properly dead time corrected, should not depend on the load per preamplifier. This fact may be used to develop the iterative calibration procedure, where the initial estimate of dead time correction may be used to extract initial dead time corrected count rate ratios for both preamplifier loads. The dead time correction estimate may then be further iterated until close agreement between the dead time corrected ratios for 100% load and 200% load measurements is achieved. The approach and hardware implementation may be applicable for both shift register and list mode data acquisition.

Expanding Measurement Range of Fork Detector

Common ionization chamber (IC) detectors, like LND™ ionization chambers, have very thin anodes, resulting in a nonlinear electrical field that causes space charge effects and intensive recombination around the anodes, leading to non-linearity in the average detector current. The I-V curve of the IC has a long flat plateau extending from tens of volts to few hundred of volts because there is no charge multiplication. The space charge effect will be much more pronounced at the beginning of the plateau, where the field, drifting time, and probability for recombination are much higher than at the end of the plateau. Therefore, the change of the current measured at beginning and end of the plateau can be used as online correction of nonlinearity in IC response.

Figure 12:
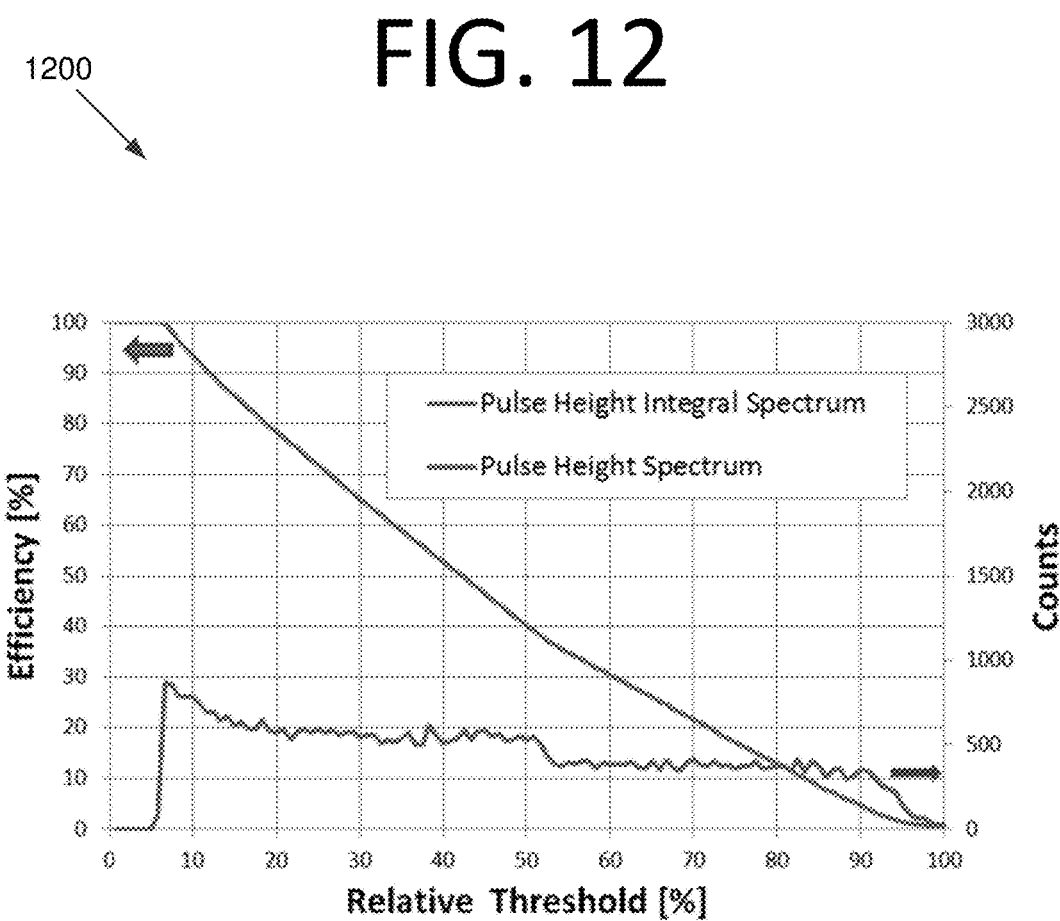
FIG. 12 is a graph illustrating integral and differential pulse height distributions of a $^{10}$B detector as a function of relative threshold settings, according to an embodiment of the present invention.

A 0.5" by 10" long $^{10}B$-lined detector with redesigned electrodes allows operation at high fields and low gain. The detector of some embodiments may withstand a gamma dose rate of up to 60,000 Rads per hour (R/h) and have a sensitivity of 1 cps/n (one neutron per second per $cm^2$). This is about 20-30 times higher than that of a fission chamber (FC) detector with the same size. The detector may operate with high rate electronics with a fast time constant and a remotely controlled threshold for adjusting the sensitivity and gamma tolerance according the measured gamma field, as shown in graph 1200 of FIG. 12. The $^{10}B$ pulse height spectra provide near-linear dependence of detector efficiency versus threshold setting. Besides allowing the replacement of FCs, which are difficult to ship, such embodiments may have superior adaptive sensitivity that may extend the measurement range many times higher and allow measurements of sources ranging from long cooling time assembles and hot assembles of spent nuclear fuel with high gamma and neutron emission. It should be noted that the gamma pile-up threshold changes logarithmically with the gamma field. A $^{10}$B detector, shielded in a 1" tube diameter, ¼" thick tungsten sleeve, may be a drop-in replacement package for the current FC and provide reliable operation in high gamma fields.

Using Zero Dead Time Counting Approach and Electronics

Figure 13:
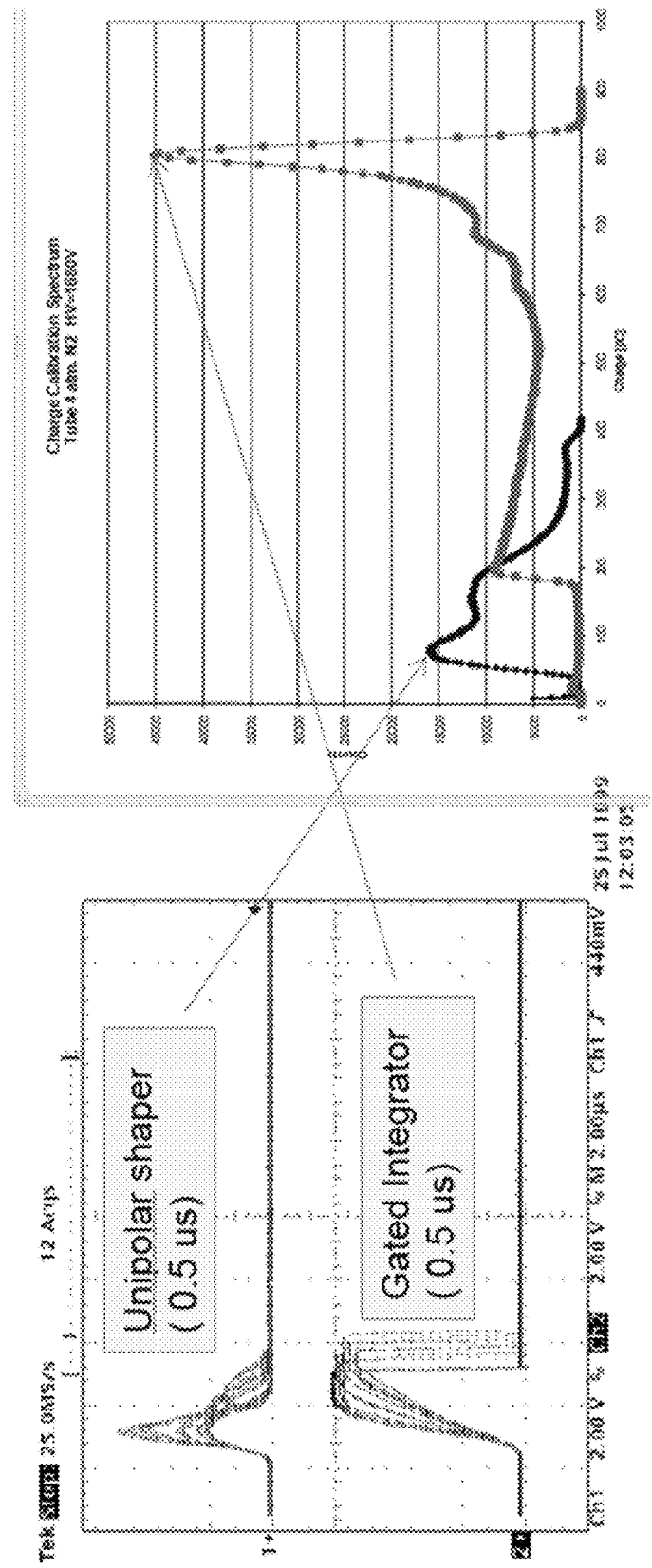
FIG. 13 illustrates graphs showing a comparison of pulse height spectra and pulse shapes from a gated integrator (GI) and unipolar shaping of pulses from $^3$He detectors, according to an embodiment of the present invention.

The counting losses in neutron counting systems are determined by the dead time of the front end electronics due to pile-up and the double pulsing effect, as described above. These effects present a fundamental limitation on the counting capabilities in neutron counting systems. However, some embodiments employ a novel approach that allows recovery of almost all pile-up pulses, which may be beneficial for accurately measuring the higher order moments of the distribution. The technique may use a GI and fast unipolar shaper with compensation for the ionic component of the current pulse. This may be based on the fact that the GI spectrum corresponds to the energy deposition in the detector where most of the signals are concentrated in the full energy deposition peak. See graphs 1300 of FIG. 13, which show a comparison of pulse height spectra from a GI and unipolar shaping.

Figure 14:
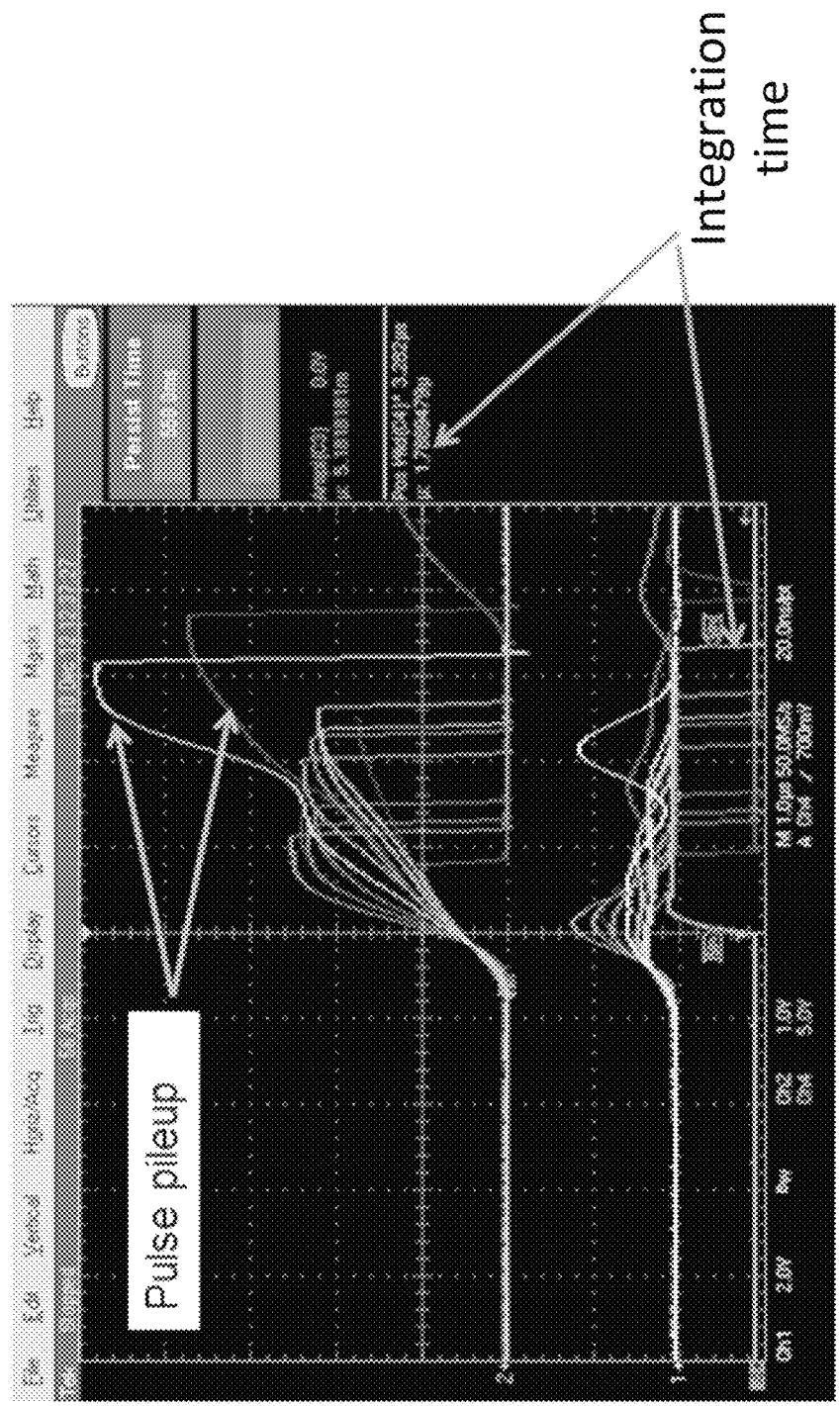
FIG. 14 is a screenshot illustrating gate integrator output (top trace), unipolar output (middle trace), and integration time (bottom trace) of pulses from a $^3$He detector, according to an embodiment of the present invention.
Figure 15:
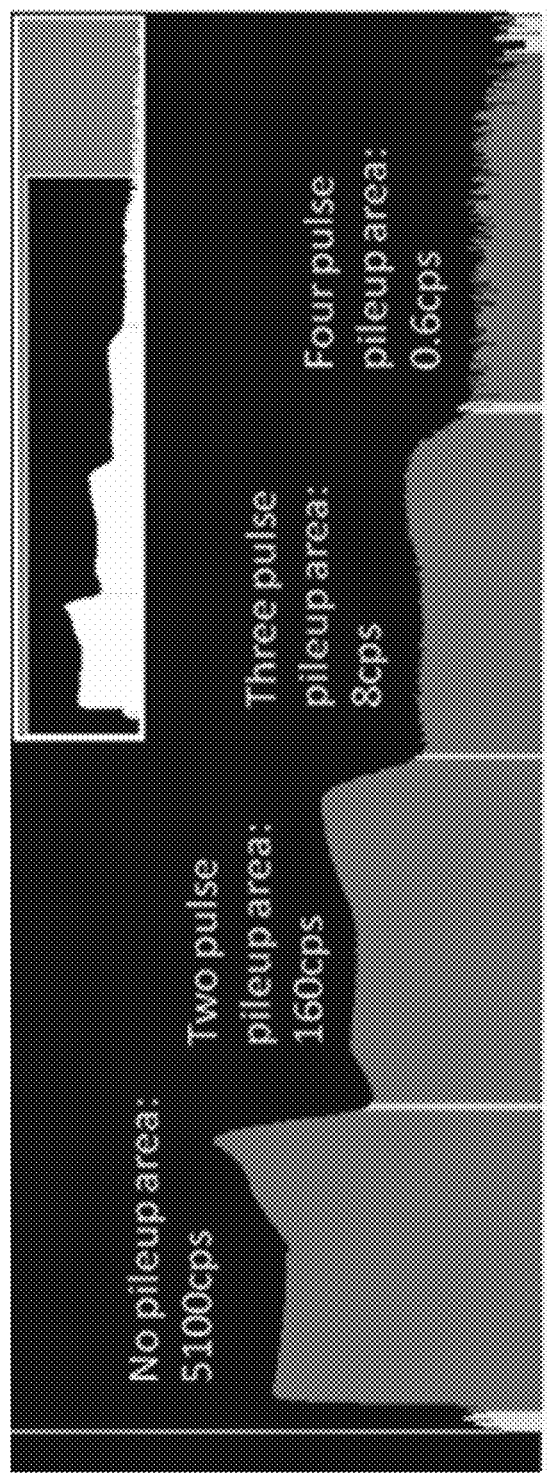
FIG. 15 is a graph illustrating a pulse height spectrum (log scale) of GI $^3$He pulses and their pile-ups at an initial count rate of about 5300 cps, according to an embodiment of the present invention.

The area of each pulse does not change with the time interval between the pulses, and so the information on the number of pulses is conserved even during a pile-up. See, e.g., screenshot 1400 of FIG. 14. The average integration time is approximately 2 microseconds. The pile-up spectra of double, triple, etc., pileup are self-convolutions of the main spectrum (see graph 1500 of FIG. 15). The pile-up pulses can be identified and returned to the data stream. The fact that pile-ups can be up to the fourth order that can be observed even at this low count rate shows the importance of dead time loss compensation, and the extent that the zero dead time method can improve measurements. The average busy time of the GI with 10 atm $^3$He tubes is less than 1.5 s and about 95% of all pileup events will be recovered. The initial experimental data demonstrates this principle.

The pile-up distribution below the pile-up threshold is a deterministic fraction that does not depend on count rate, and thus can be exactly corrected. Use of a multichannel analyzer (MCA) may allow setting of the event threshold as a fraction of a 764 keV peak, and thus assure a high level of performance stability. A set of multiple discriminators may be used to identify the pile-up pulses and add them to the analysis data stream. Any time delay in this process is short and does not affect the determination of correlations in the data.

In order to fully test the improvements in both analytical capabilities and in signal processing, an existing counter, such as the Epithermal Neutron Multiplicity Counter (ENMC) may be modified with a new electronics package to optimize the ability to accurately measure the higher order moments of the emitted multiplicity distribution, as well as determine how this information impacts the determination of the properties of the item being measured.

FIG. 16 is an example functional diagram illustrating electronics 1600 for zero dead time counting that produces GI pulses where 0, 1, 2, 3, etc. pile-up events can occur, according to an embodiment of the present invention. The charge pulses produced by the detector are amplified and conditioned by charge sensitive preamplifier stage 1610. The amplification is performed by operational amplifier 1612 with feedback capacitor 1616 and feedback resistor 1614.

The conditioning includes compensation of the long ionic tail from a $^3$He detector in order to minimize the duration of the filtered pulses in subsequent stages. The conditioning is performed by resistor 1620 and capacitor 1618 connected in the feedback of amplifier 1612 and is adjusted using a potentiometer 1622. Additional capacitor-resistor-potentiometer units like 1618, 1620, 1622 can be added for better compensation of the ionic component.

The amplified and conditioned signal is connected to the input IN of a unipolar shaper 1632 of unipolar pulse shaper stage 1630 that has a baseline restorer (BLR) gate 1634. Unipolar shaper 1632 outputs an analog unipolar pulse OUT and a logic gate signal from BLR gate 1634, the duration of which indicates the beginning and the end of the shaped detector signal. BLR gate 1634 closes switch 1642 of gated integrator stage 1640 and opens switch 1650 through inverter 1658. This begins integration of the shaped detector signal by an integrator consisting of operational amplifier 1648, resistor 1644, and capacitor 1646. After BLR gate 1634 ends, switch 1642 opens and the integrator holds the value for a time duration determined by the time it takes to discharge a charge in capacitor 1656 through resistor 1654. Capacitor 1656 was charged through diode 1652 during BLR gate 1634. After this time duration, switch 1650 is closed, which resets the integrator to the value V_REF.

As the integrator increases its output value during the shaped pulse integration, this value may cross one or more preset thresholds that correspond to amplitudes caused by neutron pulses with zero, one, two, or more pile-ups. When these thresholds are crossed, comparators 1662, 1664, 1666 in discriminator stage 1660 will trigger and generate countable pulses, thus restoring the count of piled up pulses that would have been lost in a regular discriminator. In some embodiments, additional comparators may be used.

Figure 17:
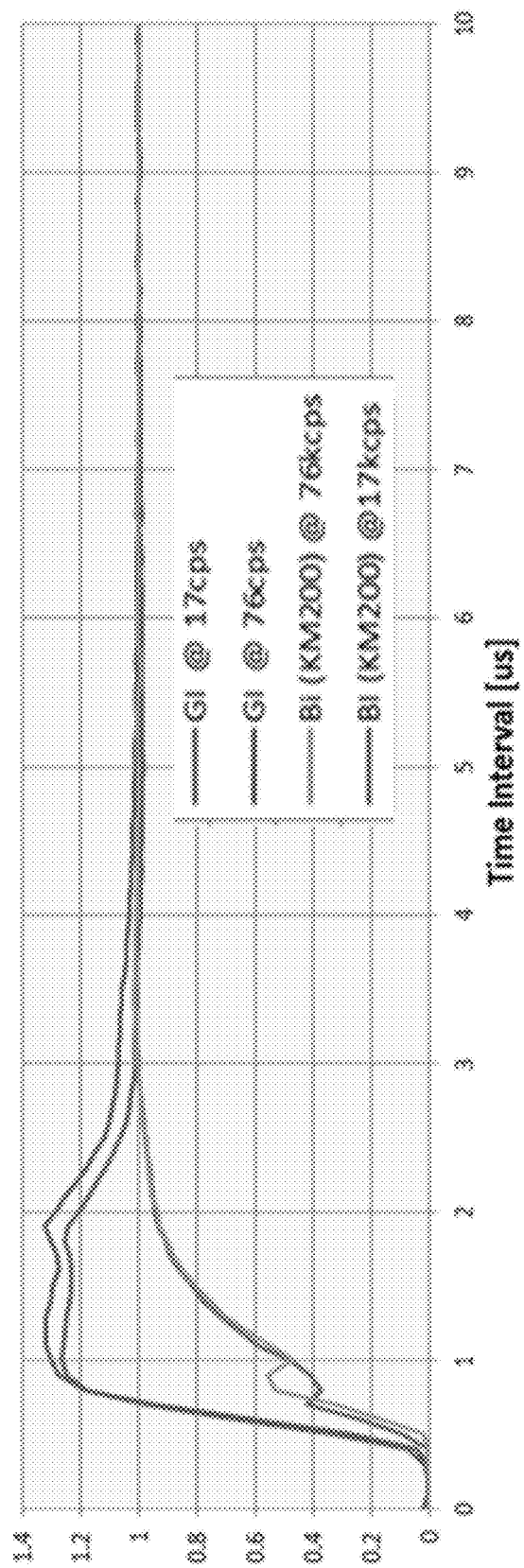
FIG. 17 is a graph illustrating Rossi-Alpha distributions normalized to the time interval 300-600 µs measured for 17 kcps and 76 kcps with a zero DT architecture, according to an embodiment of the present invention.

In developing zero-dead time solutions, it may be beneficial to focus on understanding the ZDT technology behavior using a non-correlated Am—Li source. The Rossi-Alpha distributions at different count rates were obtained for both bipolar and GI shapers, as shown in graph 1700 of FIG. 17, which illustrates Rossi-Alpha distributions normalized to the time interval 300-600 µs measured for 17 kcps and 76 kcps, according to an embodiment of the present invention. The first 10 µs is shown to outline the difference between the two shapers. The overshoot in the GI distribution is due to real pile-up events (the GI is free from double pulsing by its principle of operation) that are spread in later moments of time. The difference between the GI plots at 17 kcps and 76 kcps is due to unrecognized pile-up pulses.

Figure 18:
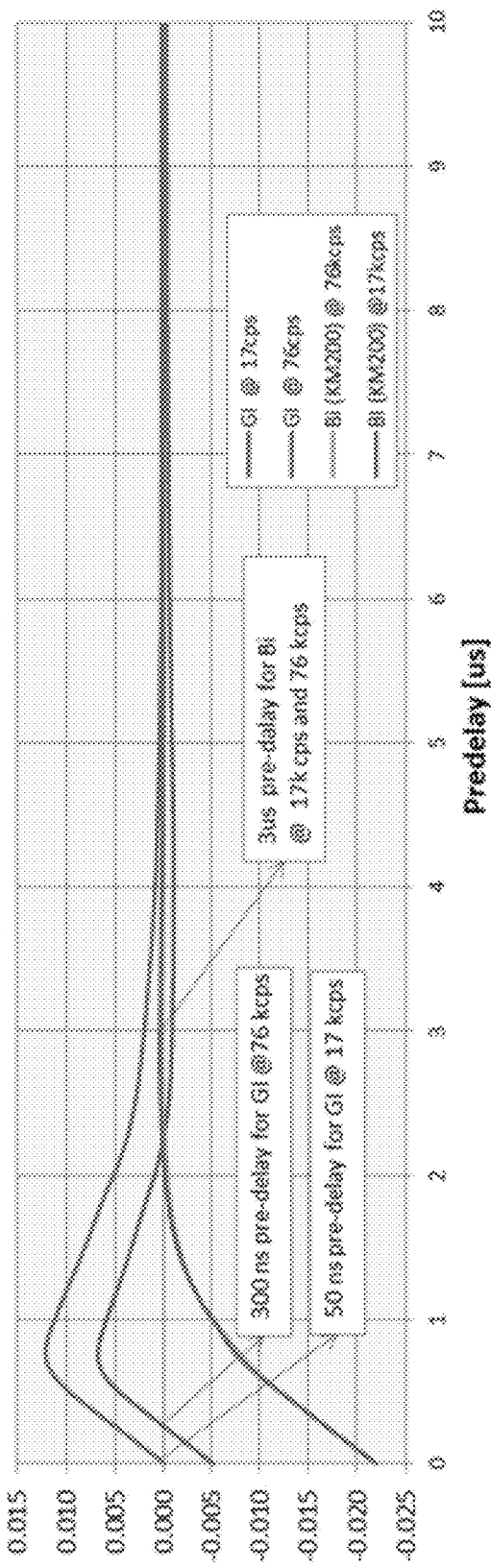
FIG. 18 is a graph illustrating normalized doubles (Reals-Accidentals) distributions, according to an embodiment of the present invention.

The normalized doubles (Reals-Accidentals) as function of pre-delay time for both Rossi-Alpha distributions were calculated and plotted in graph 1800 of FIG. 18. The bipolar shaper requires pre-delay of a couple microseconds to cancel the bias due to DT losses. The overshoot in the GI Rossi-Alpha distribution could provide a unique opportunity to cancel the bias from the DT losses if a count rate dependent pre-delay is used.

Combined Neutron Counting and Gross Gamma Measurement

Figure 19A:
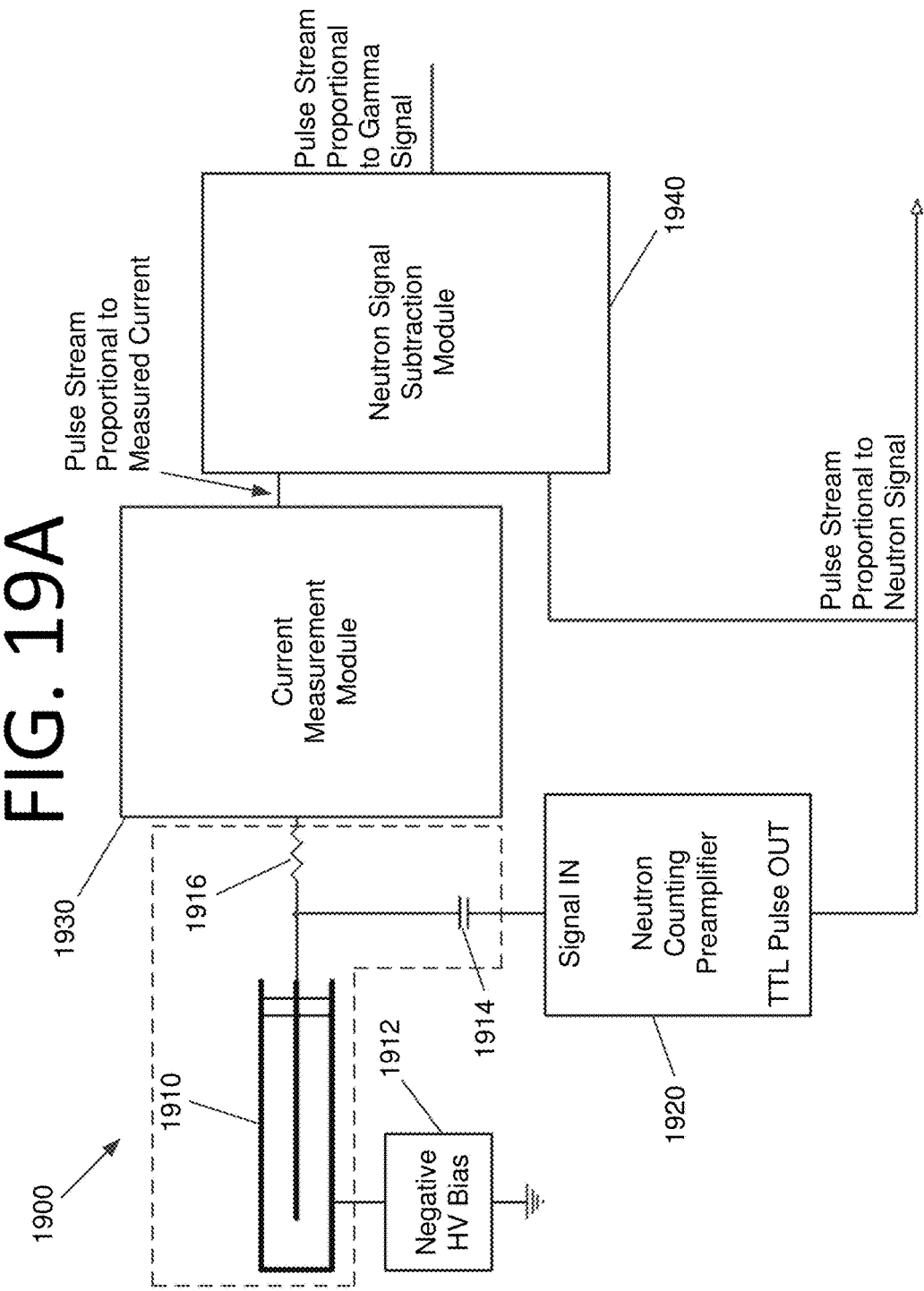
FIG. 19A is a simplified block diagram illustrating a circuit that performs simultaneous gamma and neutron signal readout using the same neutron detector where a negative high voltage bias is applied to the outside of the neutron detector, according to an embodiment of the present invention.

FIG. 19A is a simplified block diagram illustrating a circuit 1900 that performs simultaneous gamma and neutron signal readout using a same neutron detector 1910 where a negative high voltage bias 1912 is applied to the outside of neutron detector 1910, according to an embodiment of the present invention. In circuit 1900, the outside electrode of neutron detector 1910 (e.g., a $^{235}$U fission chamber or $^3$He or $^{10}$B-lined proportional counter) is negatively biased by HV bias module 1912 and the signal readout is taken from an internal electrode (the anode) of neutron detector 1910, which is connected through a resistor 1916 to the input of a current measurement module 1930. Resistor 1916 acts a load resistor for the neutron pulses that appear to have a much higher amplitude than gamma signal. The neutron pulses are sensed by a neutron counting preamplifier similar to that described in certain embodiments above. Capacitor 1914 provides galvanic decoupling of the pulse mode electronics (i.e., neutron counting preamplifier 1920) from the current mode electronics (i.e., current measurement module 1930). Collectively, neutron detector 1910, capacitor 1914, and resistor 1916 constitute detector connection circuitry for negative bias and dual neutron readout from the anode, as denoted by dashed lines in FIG. 19A.

The amplitude discriminator in neutron counting amplifier 1920 is set higher than the gamma signal including single pulses with very high count rates, but much lower amplitude than is measured as an average current. Both neutron and gamma pulses are present at the input of current measurement module 1930, which outputs a pulse stream with an average pulse rate proportional to the sum of the neutron and gamma current signals. The separation of the neutron component is performed in neutron signal subtraction unit 1940. The neutron subtraction coefficient is adjusted during the calibration with a neutron source only to cancel the neutron signal. Note that the calibration is valid only for the detector and electronics settings used for the calibration in some embodiments.

Figure 19B:
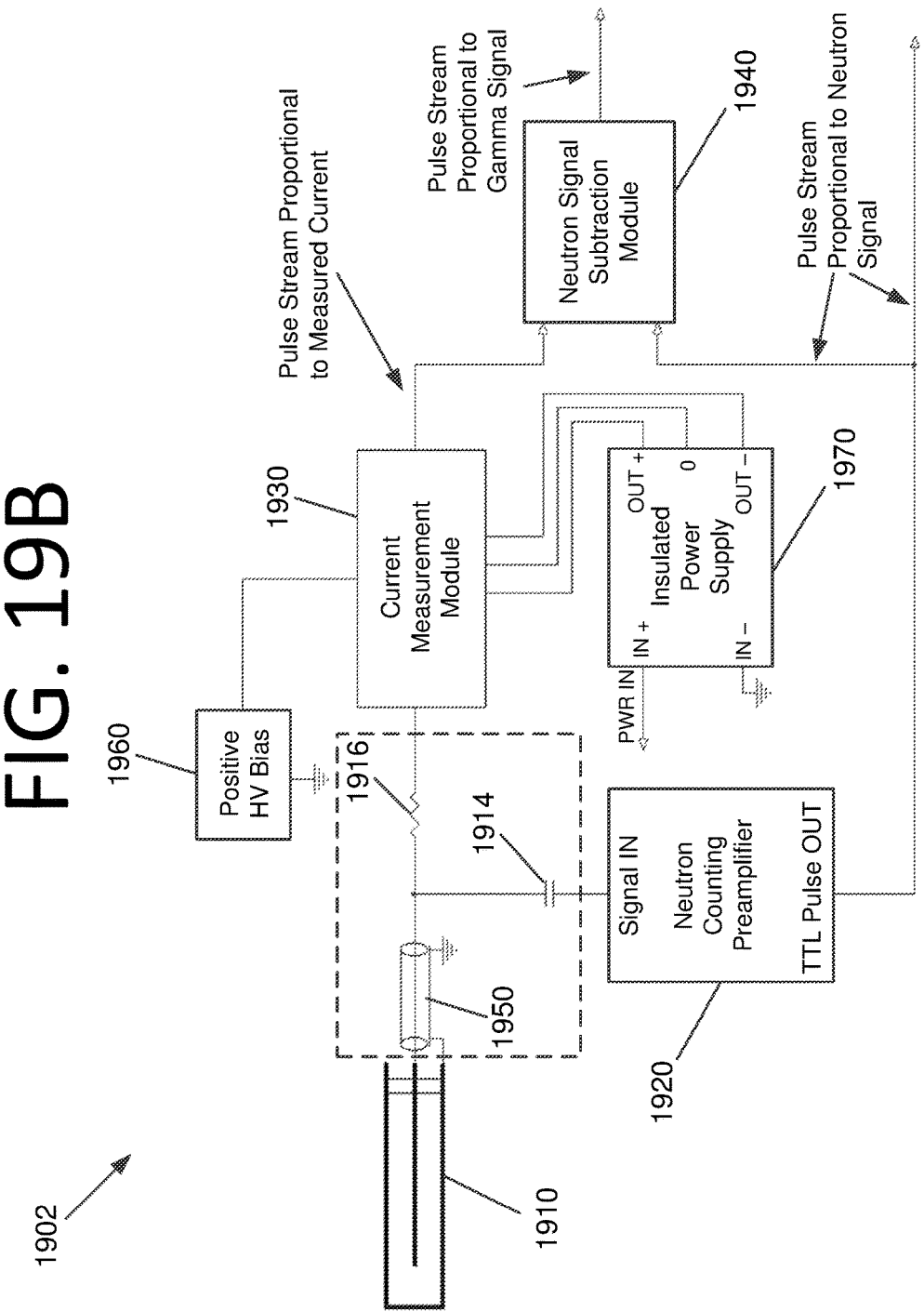
FIG. 19B is a simplified block diagram illustrating a circuit that performs simultaneous gamma and neutron signal readout using the same neutron detector where a positive high voltage bias is applied to current measurement electronics instead of to the outside of the neutron detector, according to an embodiment of the present invention.

FIG. 19B is a simplified block diagram illustrating a circuit 1902 that performs simultaneous gamma and neutron signal readout using the same neutron detector 1910 where a positive high voltage bias 1960 is applied to current measurement electronics 1930 instead of to the outside of neutron detector 1910, according to an embodiment of the present invention. This allows the body of detector 1910 to be grounded and a long coaxial cable 1950 to be used for connection. The grounding of the body of detector 1910 and the use of a long coaxial cable 1950 are beneficial for many applications. To achieve this configuration, current measurement electronics 1930 is powered through an insulated power supply 1970. Collectively, coaxial cable 1950, capacitor 1914, and resistor 1916 detector connection circuitry for positive bias and dual neutron readout from the anode, as denoted by dashed lines in FIG. 19B.

A dual mode measurement with circuit 1900 of FIG. 19A using a $^{10}$B lined detector produced excellent linearity for gamma dose rate values up to 750 R/h and excellent stability of neutron counting in high gamma fields (up to 100000 R/h). The results for the gamma does rate measurements using the current channel with a special 0.5" by 4" long $^{10}$B detector with a 250 micron thick anode are shown in graph 1980 of FIG. 19C. The calculated gamma sensitivity for different HV biases (tube gain) is in the ballpark of LND gamma DC ionization chambers widely used for gamma measurements.

Figure 19D:
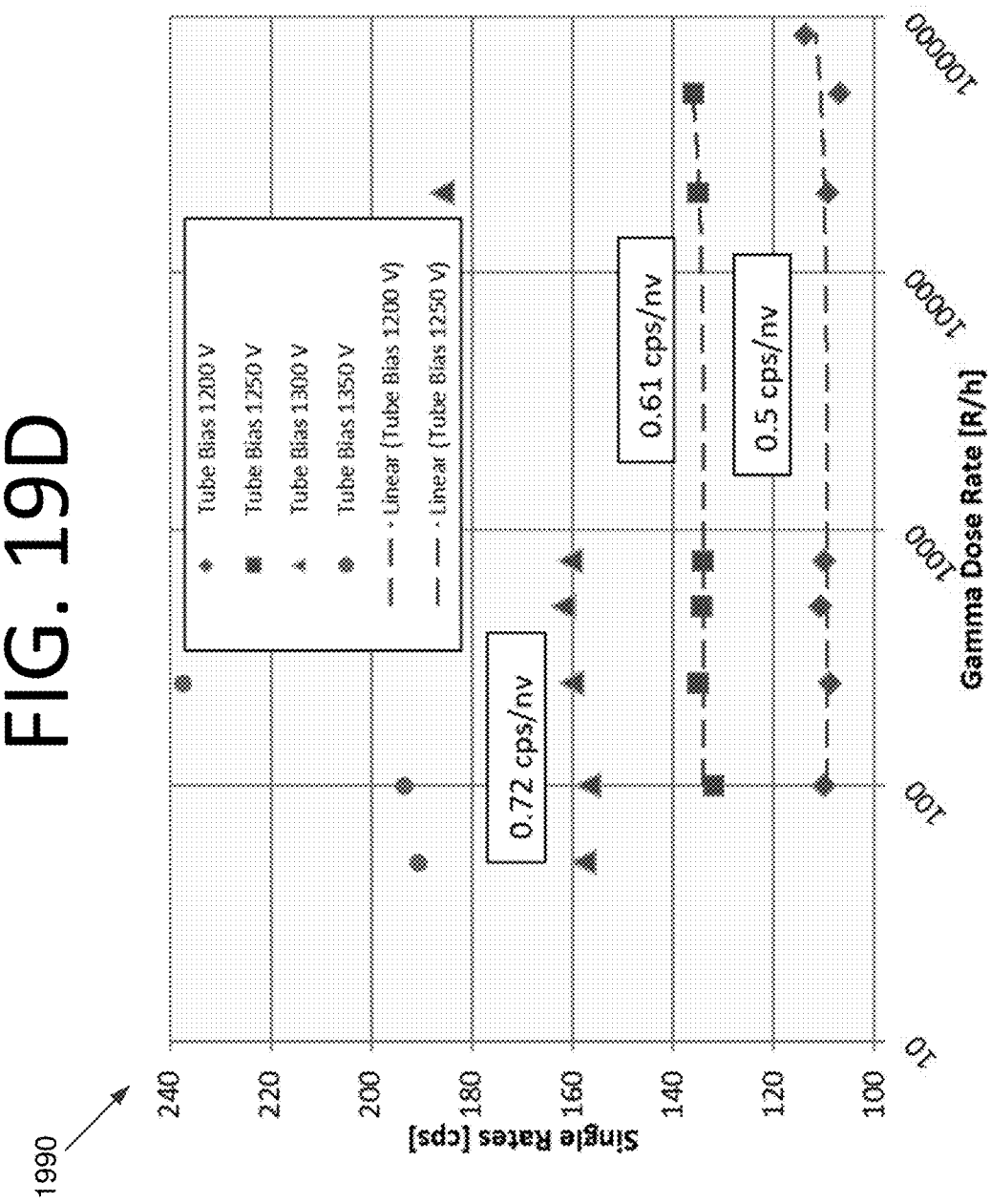
FIG. 19D is a graph illustrating measured neutron counting channel response with the same detector, according to an embodiment of the present invention.

FIG. 19D shows a graph 1990 of measured neutron counting channel response with the same detector. The neutron sensitivity of the detector was calibrated experimentally using a $^3$He tube with the same size. The calculated sensitivity is a of couple times higher than a 1" by 12" $^{235}$U neutron fission chamber with typical sensitivity (0.14 cps/nv).

FIG. 20 is a simplified schematic illustrating a current measurement module 2000 that expands measurement range and accuracy for DC mode gamma ionization chambers, according to an embodiment of the present invention. In FIG. 20, current measurement module 2000 includes a trans-conductance amplifier (TCA) 2030 with an operational amplifier 2032 and resistors 2034, 2036 in feedback, where the detector current $I_{DET}$ is converted into a voltage $V_A=I_{DET}*R_{FB}$, where $R_{FB}$ is the resistance of resistor 2036 or the sum of the resistances of resistors 2034, 2036 depending on the state of a second relay 2022. The voltage $V_A$ is measured and converted to a digital value by an analog-to-digital converter (ADC) 2040.

One of the outputs of current measurement module 2000 is the output of ADC 2040. This output is also connected to a subranging control 2050 including a subrange relay control (SRC) and a magnitude comparator. Subranging control 2050 determines which sensitivity to select for TCA 2030 and sends a switching signal to relay 2022 via subrange relay control 2052. The sensitivity determination is performed by magnitude comparator 2054, which has a hysteresis defined by magnitude values $N_{min}$ and $N_{max}$. The state of subranging control 2050 is one of the outputs of current measurement module 2000. Code-to-pulse stream converter 2060 outputs a pulse stream with an average pulse rate proportional to the detector current by processing the digital value measured by ADC 2040 and the state of subranging control 2050.

The expansion of the dynamic range is provided by adding a second range in operational amplifier 2032: resistor 2036, normally open contact relay 2022, and magnitude comparator 2054. Resistor 2034 has the value of (N−1)* (resistance of resistor 2034), where N is the expansion factor of the dynamic range. Relay 2022 bypasses resistor 2034, and thus reduces the sensitivity of TCA 2030 in factor of N. The voltage $V_A$ of TCA 2030 will be N times lower for the same detector current. The output pulse rate is multiplied by a factor of N by code-to-pulse stream converter 2060. The frequency at the output of ADC 2040 is on the order of 10-100 kHz. A pulse stream generator (not shown) is used to generate a pulse train of exactly N short pulses for each pulse from ADC 2040, and thus compensates for reduced sensitivity of TCA 2030.

Figure 20A:
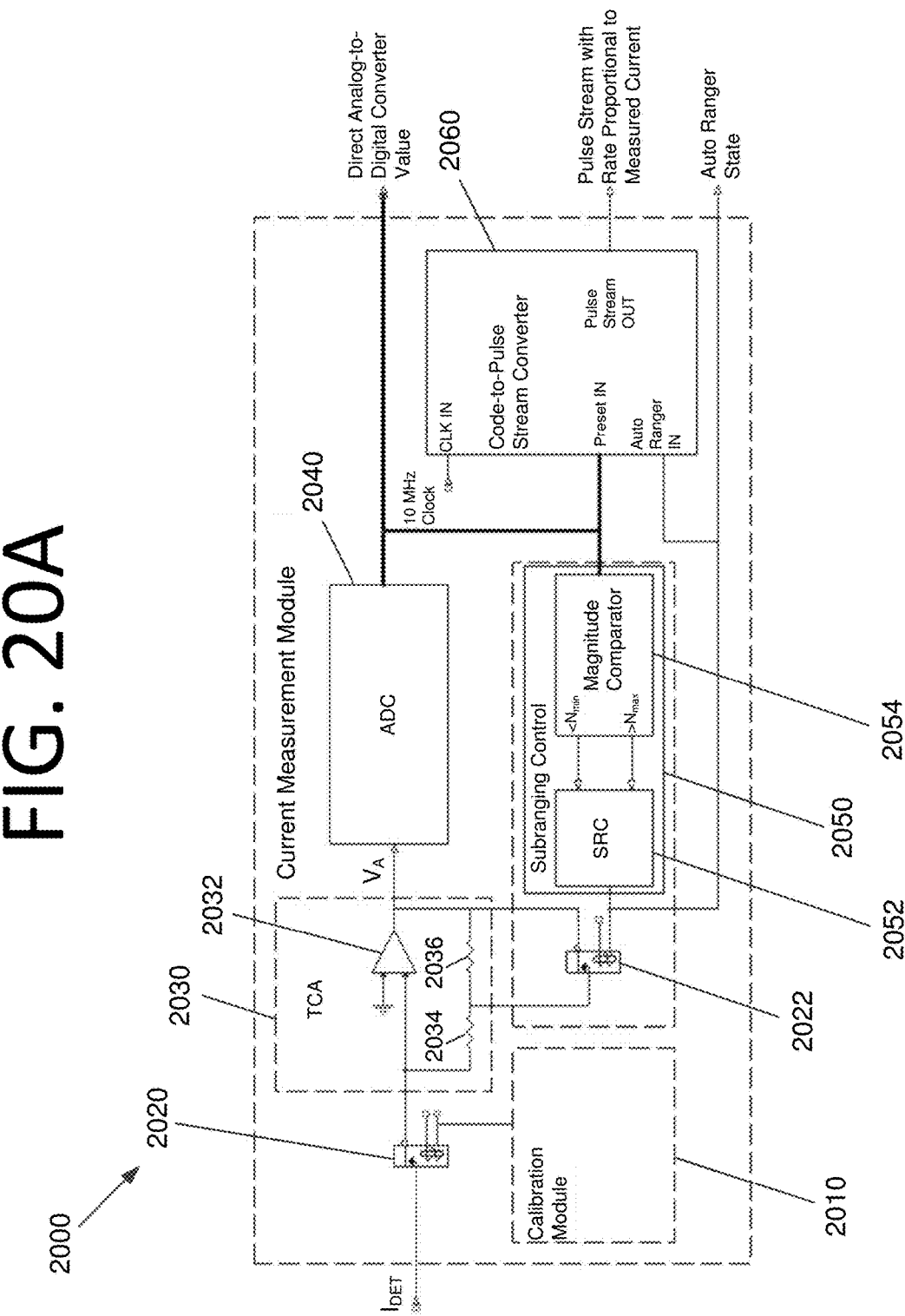
FIG. 20A is a simplified schematic illustrating a current measurement module that expands measurement range and accuracy for DC mode gamma ionization chambers, according to an embodiment of the present invention.
Figure 20B:
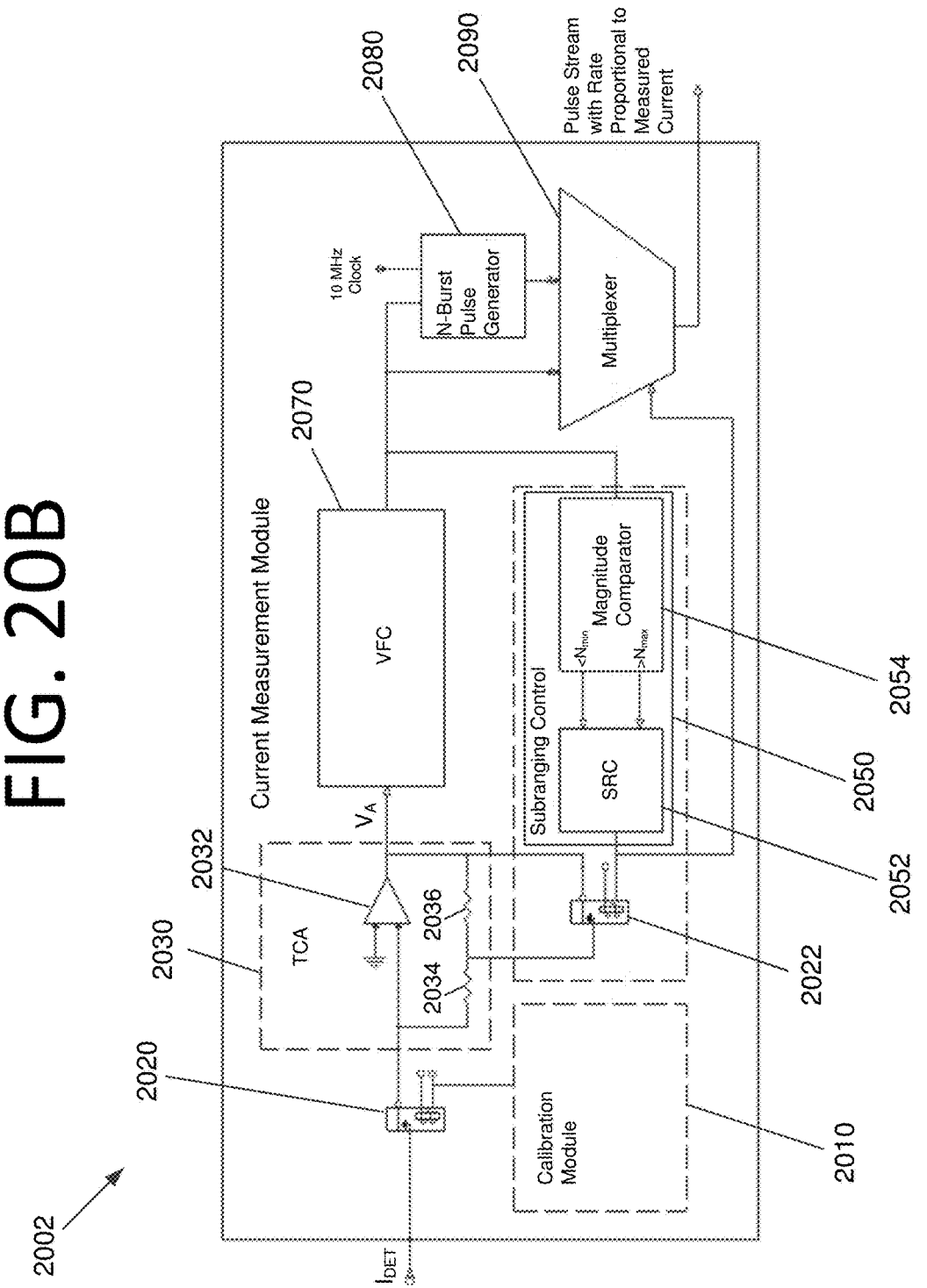
FIG. 20B is a simplified schematic illustrating a current measurement module that implements the functionality of the current measurement module of FIG. 20 using a novel simplified output pulse rate generation approach, according to an embodiment of the present invention.

FIG. 20B is a simplified schematic illustrating a current measurement module 2002 that implements the functionality of current measurement module 2000 of FIG. 20A using a novel simplified output pulse rate generation approach, according to an embodiment of the present invention. In current measurement module 2002, $V_A$ is converted to a pulse stream using voltage-to-frequency converter (VFC) 2070. On each rising edge of the output of VFC 2070, an N-burst pulse generator 2080 produces N short pulses. Thus, the output pulse rate of N-burst pulse generator 2080 is a factor of N greater than that of VFC 2070. A multiplexer 2090 is used to switch between the slower pulse rate from VFC 2070 and the N times faster rate of N-burst pulse generator 2080. The lower output pulse rate is selected when subranging control 2050 has switched TCA 2030 to high sensitivity, and the high output pulse rate is selected when subranging control 2050 has switched TCA 2030 to N times lower sensitivity.

In both current measurement modules 2000, 2002, the detector input $I_{DET}$ can be disconnected from TCA 2030 with relay 2020 for calibration purposes. Calibration module 2010 controls relay 2020. Once the detector is disconnected from the input (i.e., TCA 2030) the current and voltage offsets of TCA 2030 can be measured and subsequently subtracted. To subtract both offsets, two measurements should be performed. In the first measurement, relay 2022 is opened and TCA 2030 is in high current sensitivity range. In the second measurement, relay 2022 is closed and TCA 2030 is N times less sensitive to current. The offset voltage will be the same in both measurements, while the current offset will add an output voltage that is N times greater in the first measurement than the second measurement.

Figure 21:
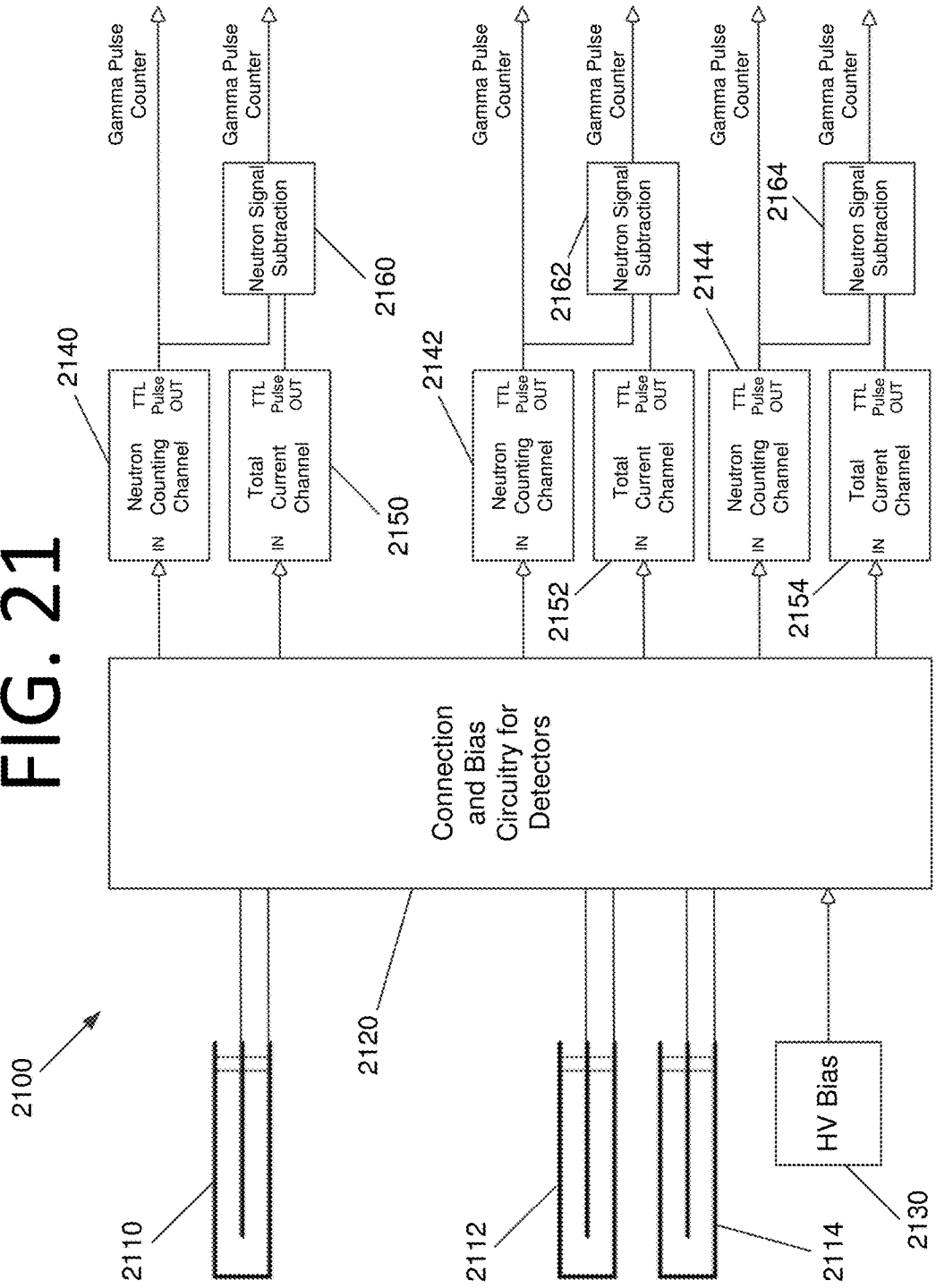
FIG. 21 is an architectural diagram illustrating a system of high count rate thermal neutron detector electronics, according to an embodiment of the present invention.

FIG. 21 is an architectural diagram illustrating a system 2100 of high count rate thermal neutron detector electronics, according to an embodiment of the present invention. Detectors 2110, 2112, 2114 that may be various (and potentially different from one another) proportional counter and/or ionization chamber varieties as disclosed herein are connected to detector connection and bias circuitry 2120 that are provided with HV bias 2130. Detector connection and bias circuitry 2120 may be provided with a negative HV bias (e.g., the configuration shown in FIG. 19A) or a positive HV bias (e.g., the configuration shown in FIG. 19B).

Detector connection and bias circuitry 2120 connects to neutron counting channels 2140, 2142, 2144, and also, when a gross gamma measurement is needed, to total current channels 2150, 2152, 2154. Each pair of neutron counting channels 2140, 2142, 2144 and total current channels 2150, 2152, 2154 is connected to a respective neutron signal subtraction module 2160, 2162, 2164, outputting logic pulses at average rates proportional to that seen by detectors 2110, 2112, 2114. In some embodiments, total current channels 2150, 2152, 2154 may be at least one of circuits 2000 and/or 2002 of FIGS. 20A and/or 20B.

Neutron counting channels 2140, 2142, 2144 may also be one or more of various embodiments thereof shown and described herein. For instance, a neutron counting channel could have low noise amplification, an RLC filter, and a T-bridge shaper (see FIG. 1), implement a discriminator with advanced hysteresis and a remote threshold (see FIG. 2), implement pulse width inspection for double pulsing rejection (see FIGS. 5A-6B), implement a discriminator with a gated integrator of the first half wave of the bipolar shaped detector pulse (see FIG. 7), have two shaper channels with different time constants and use the faster shaper channel to operate at higher threshold and lower efficiency reducing its dead time, thus allowing for correction of the dead time losses of the slower shaper/discriminator (see FIG. 10), provide a dead time correction architecture with differently loaded amplifiers that implements a dead time correction process (see FIGS. 11A and 11B), or implement a zero dead time architecture (see FIGS. 14-16).

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system of high count rate thermal neutron detector electronics, comprising:
    at least one neutron detector and a high voltage (HV) bias;
    detector connection and bias circuitry operably connected to the at least one neutron detector and the HV bias; and
    at least one neutron counting channel and at least one total current channel operably connected to the detector connection and bias circuitry.

2. The system of claim 1, wherein the at least one total current channel comprises a current measurement module that expands measurement range and accuracy for direct current (DC) mode gamma ionization chambers.

3. The system of claim 2, wherein the current measurement module comprises:
    a trans-conductance amplifier (TCA) configured to produce an output voltage; and
    an analog-to-digital converter (ADC) operably connected to the output voltage from the TCA, the ADC is configured to convert the output voltage from the TCA to a digital value and provide the digital value as its output.

4. The system of claim 3, wherein the current measurement module further comprises:
    a subranging control comprising a subrange relay control (SRC) configured to send a switching signal to a relay and a magnitude comparator configured to perform a sensitivity determination and having a hysteresis defined by minimum and maximum magnitude values magnitude values $N_{min}$ and $N_{max}$, wherein
    the digital value output from the ADC is operably connected to the subranging control, and
    the subranging control outputs its state.

5. The system of claim 3, wherein the current measurement module further comprises:

a code-to-pulse stream converter operably connected to the outputs of the ADC and the subranging control, the code-to-pulse stream converter configured to output a pulse stream with an average pulse rate proportional to a current of the at least one detector by processing the digital value measured by the ADC and the state of the subranging control.

6. The system of claim 2, wherein the current measurement module further comprises:
   a voltage-to-frequency converter (VFC) operably connected to the output from the TCA, the VFC configured to convert the output from the TCA into a pulse stream as its output;
   an N-burst pulse generator operably connected to the output from the VFC, the N-burst pulse generator configured to produce N short pulses, wherein the integer N a factor greater than a pulse rate of the VFC;
   a subranging control; and
   a multiplexer operably connected to the VFC, the N-burst pulse generator, and the subranging control, the multiplexer configured to switch between the slower pulse rate from the VFC and the N times faster pulse rate of the N-burst pulse generator, wherein
   the lower pulse rate is selected when the subranging control has switched the TCA to high sensitivity, and
   the higher pulse rate is selected when the subranging control has switched the TCA to N times lower sensitivity.

7. The system of claim 1, wherein the at least one neutron counting channel comprises low noise amplification, an RLC filter, and a T-bridge shaper.

8. The system of claim 1, wherein the at least one neutron counting channel is configured to implement a discriminator with return to zero hysteresis and a remote threshold, the at least one neutron counting channel comprising:
   discriminator hysteresis circuitry; and
   remote or local threshold option circuitry operably connected to the advanced discriminator hysteresis circuitry.

9. The system of claim 1, wherein the at least one neutron counting channel is configured to implement pulse width inspection for double pulsing rejection, the at least one neutron counting channel comprising:
   a first inverter that receives a discriminator TTL pulse as an input;
   a Schottky diode and passive R-C integration circuitry comprising a potentiometer and a capacitor, the Schottky diode the passive R-C integration circuitry connected in parallel after the first inverter, wherein the R-C integration circuitry converts a fast leading edge of the discriminator TTL pulse OUT into an exponentially rising voltage on the capacitor; and
   a second inverter connected in parallel to the Schottky diode and the passive R-C integration circuitry, wherein
   the second inverter reaches its switching threshold only when a duration of a comparator logic pulse is greater than a duration of parasitic spurious pulses.

10. The system of claim 1, wherein the at least one neutron counting channel is configured to implement pulse width inspection for double pulsing rejection, the at least one neutron counting channel comprising:
    an inverter that receives a discriminator TTL pulse as an input;
    a bipolar transistor switch;
    a first resistor connected to an output of the inverter and an input of the bipolar transistor switch;
    a second resistor connected in parallel to the bipolar transistor switch;
    a potentiometer connected in series to an output of the second resistor; and
    a comparator and a capacitor connected in parallel to the bipolar transistor switch.

11. The system of claim 1, wherein the at least one neutron counting channel is configured to implement a discriminator with a gated integrator of a first half wave of a bipolar shaped detector pulse, the at least one neutron counting channel comprising:
    a gain control amplifier with prefilter discriminator stage;
    a gated integrator stage operably connected to the gain control amplifier with prefilter discriminator stage; and
    a neutron discriminator stage operably connected to the gated integrator stage.

12. The system of claim 1, wherein the at least one neutron counting channel comprises two shaper/discriminator channels with different time constants, wherein a faster shaper channel of the two shaper/discriminator channels is used to operate at a higher threshold and lower efficiency, reducing its dead time, thereby allowing for correction of the dead time losses of a slower shaper/discriminator channel of the two shaper/discriminator channels.

13. The system of claim 1, wherein the at least one neutron counting channel implements a zero dead time architecture, the at least one neutron counting channel comprising:
    a charge sensitive preamplifier stage configured to provide compensation of an ionic component;
    a unipolar pulse shaper stage with a gated base line restorer operably connected to the charge sensitive preamplifier stage;
    a first gated integrator stage operably connected to the unipolar pulse shaper stage; and
    a comparator bank operably connected to the first gated integrator stage.

14. The system of claim 1, further comprising:
    a first and second preamplifier;
    a first set of detectors directly connected to the second preamplifier;
    a relay; and
    a second set of detectors connected to the relay, wherein
    the relay is configured to switch a signal of the second set of detectors between the first preamplifier and the second preamplifier,
    when the second set of detectors is switched to the first preamplifier, a count rate load per channel is 100%, and
    when the second set of detectors is switched to the second preamplifier, the count rate load per channel is 200%.

15. The system of claim 1, further comprising:
    a first preamplifier, a second preamplifier, a third preamplifier, and a fourth preamplifier;
    a first and second detector connected to the first preamplifier;
    a third detector connected to the second preamplifier;
    a fourth detector connected to the third preamplifier;
    a fifth and a sixth detector connected to the fourth preamplifier; and
    a first and a second logic OR gate, wherein
    outputs from the second and the third preamplifiers are summed through the first logic OR gate such that a count rate load per channel is 100%, and
    outputs from the first and the fourth preamplifiers are summed through the second logic OR gate such that the count rate load per channel is 200%.

16. The system of claim 1, further comprising:
at least one neutron signal subtraction module operably connected to the at least one neutron counting channel and the at least one total current channel, wherein
the at least one neutron counting channel and the at least one signal subtraction channel each output logic pulses at average rates proportional to the at least one neutron detector.

17. A current measurement module, comprising:
a trans-conductance amplifier (TCA) configured to produce an output voltage; and
an analog-to-digital converter (ADC) operably connected to the output voltage from the TCA, the ADC is configured to convert the output voltage from the TCA to a digital value and provide the digital value as its output, or a voltage-to-frequency converter (VFC) operably connected to the output from the TCA, the VFC configured to convert the output from the TCA into a pulse stream as its output.

18. The current measurement module of claim 17, further comprising:
a subranging control comprising a subrange relay control (SRC) configured to send a switching signal to a relay and a magnitude comparator configured to perform a sensitivity determination and having a hysteresis defined by minimum and maximum magnitude values magnitude values $N_{min}$ and $N_{max}$, wherein
the digital value output from the ADC is operably connected to the subranging control, and
the subranging control outputs its state.

19. A neutron counting channel configured to implement pulse width inspection for double pulsing rejection, comprising:
a first inverter that receives a discriminator TTL pulse as an input;
a Schottky diode and passive R-C integration circuitry comprising a potentiometer and a capacitor, the Schottky diode the passive R-C integration circuitry connected in parallel after the first inverter, wherein the R-C integration circuitry converts a fast leading edge of the discriminator TTL pulse OUT into an exponentially rising voltage on the capacitor; and
a second inverter connected in parallel to the Schottky diode and the passive R-C integration circuitry, wherein
the second inverter reaches its switching threshold only when a duration of a comparator logic pulse is greater than a duration of parasitic spurious pulses.

20. A neutron counting channel configured to implement pulse width inspection for double pulsing rejection, comprising:
a first inverter that receives a discriminator TTL pulse as an input;
a bipolar transistor switch;
a first resistor connected to an output of the first inverter and an input of the bipolar transistor switch;
a second resistor connected in parallel to the bipolar transistor switch;
a potentiometer connected in series to an output of the second resistor; and
a comparator and a capacitor connected in parallel to the bipolar transistor switch.

* * * * *